United States Patent
Fukuzumi et al.

(10) Patent No.: US 7,939,461 B2
(45) Date of Patent: May 10, 2011

(54) CATALYST FOR DECOMPOSITION OF FORMIC ACID, METHOD FOR DECOMPOSING FORMIC ACID, PROCESS FOR PRODUCING HYDROGEN, APPARATUS FOR PRODUCING AND DECOMPOSING FORMIC ACID, AND METHOD FOR STORING AND GENERATING HYDROGEN

(75) Inventors: Shunichi Fukuzumi, Suita (JP); Tomoyoshi Suenobu, Suita (JP); Seiji Ogo, Fukuoka (JP)

(73) Assignee: Osaka University, Osaka (JP)

( * ) Notice: Subject to any disclaimer, the term of this patent is extended or adjusted under 35 U.S.C. 154(b) by 70 days.

(21) Appl. No.: 12/515,357

(22) PCT Filed: May 17, 2007

(86) PCT No.: PCT/JP2007/060115
§ 371 (c)(1),
(2), (4) Date: Aug. 5, 2009

(87) PCT Pub. No.: WO2008/059630
PCT Pub. Date: May 22, 2008

(65) Prior Publication Data
US 2010/0034733 A1    Feb. 11, 2010

(30) Foreign Application Priority Data
Nov. 17, 2006 (JP) .................. 2006-311072

(51) Int. Cl.
*C01B 3/22* (2006.01)
*C01B 3/02* (2006.01)
*C07F 15/00* (2006.01)
*B01J 10/00* (2006.01)
*B01J 27/13* (2006.01)
*B01J 31/00* (2006.01)

(52) U.S. Cl. ............ 502/230; 502/102; 423/658.2; 546/2; 546/8; 252/188.25

(58) Field of Classification Search .............. None
See application file for complete search history.

(56) References Cited

U.S. PATENT DOCUMENTS
2007/0059633 A1   3/2007 Fukuzumi et al.

FOREIGN PATENT DOCUMENTS
JP   2004-217632   8/2004
JP   2005-104880   4/2005

OTHER PUBLICATIONS

Laine, et al., "Homogeneous Catalysis by Ruthenium Carbonyl in Alkaline Solution: the Water Gas Shift Reaction", Journal of the American Chemical Society, vol. 99, No. 1, pp. 252-253, 1977.
Yoshida, et al., "Activation of Water Molecule. 1. Intermediates Bearing on the Water Gas Shift Reaction Catalyzed by Platinum (0) Complexes", Journal of the American Chemical Society, vol. 100, No. 12, pp. 3941-3942, 1978.
Man, et al., "Synthesis, characterization and reactivity of heterobimetallic complexes ($\eta^5$-$C_5R_5$)Ru(CO)($\mu$-dppm)M(CO)$_2$($\eta$5-C5H5)(R=H, $CH_3$; M=MO, W). Interconversion of hydrogen/carbon dioxide and formic acid by these complexes", Dalton Transactions, pp. 3727-3735, 2003.
Gao, et al., "An efficient binuclear catalyst for decomposition of formic acid", Chemical Communications, pp. 2365-2366, 1998.
BASF Group, "News Release: BASF and Tekion form a Collaboration", http://www.corporate.basf.com/en/presse/mitteilungen/pm.htm?pmid=2188&id=V00-mO2sE9W7cdcp.wc, Mar. 13, 2006.
Tekion, "Welcome and Why off the grid", http://www.tekion.com/main.htm, 2006.
Ha, et al., "Direct Formic Acid Fuel Cells with 600 mA $cm^{-2}$ at 0.4V and 22° C", Fuel Cells, No. 4, pp. 337-343, 2004.
Hayashi, et al., "Aqueous hydrogenation of carbon dioxide catalysed by water-soluble ruthenium aqua complexes under acidic conditions", Chemical Communications, pp. 2714-2715, 2004.

(Continued)

*Primary Examiner* — Melvin C Mayes
*Assistant Examiner* — Yun Qian
(74) *Attorney, Agent, or Firm* — Hamre, Schumann, Mueller & Larson, P.C.

(57) ABSTRACT

A catalyst for the decomposition of formic acid including a dinuclear metal complex represented by a formula (1) below, a tautomer or stereoisomer thereof, or any of their salts,

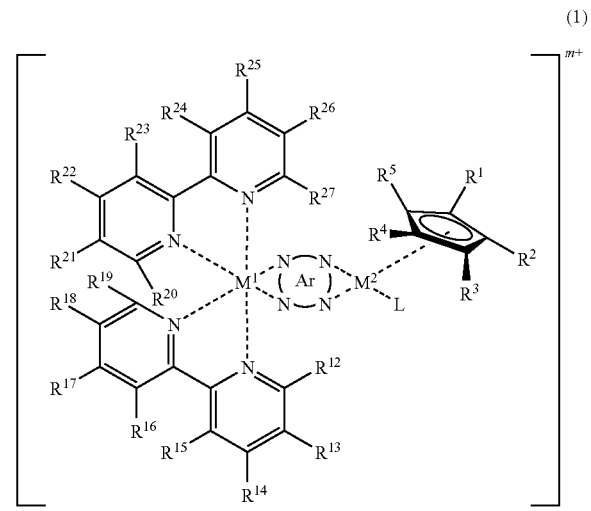

(1)

where $M^1$ and $M^2$ are transition metals; Ar is a ligand having aromaticity and may be unsubstituted or substituted; $R^1$ to $R^{27}$ are each independently a hydrogen atom, an alkyl group, or the like, or $R^{15}$ and $R^{16}$ may together form a —CH═CH—, where Hs in the —CH═CH— may be each independently replaced by an alkyl group or the like, and $R^{23}$ and $R^{24}$ may together form a —CH═CH—, where Hs in the —CH═CH— may be each independently replaced by an alkyl group or the like; L is an arbitrary ligand or is absent; and m is a positive integer, 0, or a negative integer.

16 Claims, 6 Drawing Sheets

OTHER PUBLICATIONS

Ogo, et al., "Mechanistic investigation of $CO_2$ hydrogenation by Ru(II) and Ir(III) aqua complexes under acidic conditions: two catalytic systems differing in the nature of the rate determining step", Dalton Transactions, pp. 4657-4663, 2006.

Hayashi, et al., "Accelerating Effect of a Proton on the Reduction of $CO_2$ Dissolved in Water under Acidic Conditions. Isolatio, Crystal Structure, and Reducing Ability of a Water-Soluble Ruthenium Hydride Complex", Journal of the American Chemical Society, vol. 125, No. 47, pp. 14266-14267, 2003.

Ogo, et al., "pH-Dependent Transfer Hydrogenation of Water-Soluble Carbonyl Compounds with $[Cp^*Ir^{III}(H_2O)_3]^{2+}(Cp^*=\eta^5-C_5Me_5)$ as a Catalyst Precursor and HCOONa as a Hydrogen Donor in Water", Organometallics, vol. 18, No. 26, pp. 5470-5474, 1999.

Ogo, et al., "pH-Dependant $H_2$-Activation Cycle Coupled to Reduction of Nitrate Ion by $Cp^*Ir$ Complexes", Journal of American Chemical Society, vol. 124, No. 4, pp. 597-601, 2002.

Suenobu, et al., "Excited-State Deprotonation and H/D Exchange of an Iridium Hydride Complex", Angewandte Chemie, vol. 42, No. 44, pp. 5492-5495, 2003.

Abura, et al., "Isolation and Crystal Structure of a Water-Soluble Iridium Hydride: A Robust and Highly Active Catalyst for Acid-Catalyzed Transfer Hydrogenations of Carbonyl Compounds in Acidic Media", Journal of American Chemical Society, vol. 125, No. 14, pp. 4149-4154, 2003.

Suenobu, et al., "Highly-Efficient Hydrogen Evolution in Room-Temperature Water Using Iridium Dinuclear Complex Catalyst", Abstract of the 19th Symposium on Photochemistry of Coordination Compounds, pp. 29-30, Aug. 2, 2006.

Suenobu, et al., "Catalytic Hydrogen Evolution in Room-Temperature water Using Iridium Dinuclear Complex by Decompotion of Formic Acid", Abstract of the 56th Symposium on Coordination chemistry of Japan, 2PE225, p. 361, Sep. 8, 2006.

Suenobu, et al., "Room-Temperature Hydrogen Evolution from Formic Acid Catalyzed by Organoiridium Complexes Bearing Bridging Ligands in Water", Abstract of the Chemical Society of Japan, The Chemical Society of Japan, 1 E4-40, vol. 87, p. 1169, Mar. 12, 2007.

Suenobu, et al., "Photo-induced Deprotonation of Iridium Hydrido Dinuclear Complex under visible light Eradiation and Catalytic Hydrogen Evolution", Abstract of the Fifth SORST Joint Symposium—Organic Conducting Materials and Electron Transport Control, p. 68, P404, May 2006.

Suenobu, et al., "Highly-Efficient Hydrogen Evolution in Room-Temperature Water using Iridium Dinuclear Complex Catalyst", PowerPoint material for the 19th Symposium on Photochemistry of Coordination Compounds, 11 pages, Aug. 2, 2006.

CATALYST FOR DECOMPOSITION OF FORMIC ACID, METHOD FOR DECOMPOSING FORMIC ACID, PROCESS FOR PRODUCING HYDROGEN, APPARATUS FOR PRODUCING AND DECOMPOSING FORMIC ACID, AND METHOD FOR STORING AND GENERATING HYDROGEN

TECHNICAL FIELD

The present invention relates to a catalyst for the decomposition of formic acid, a method for decomposing formic acid, a process for producing hydrogen, an apparatus for producing and decomposing formic acid, and a method for storing and generating hydrogen.

BACKGROUND ART

Hydrogen ($H_2$) is used in many different applications, such as the synthesis of various substances, reduction, hydrodesulfurization of petroleum, and hydrogenolysis, and is needed in every industrial field. For example, fuel cells, which have been attracting attention in recent years, are capable of supplying electricity continuously and efficiently when reactants such as hydrogen and oxygen are supplied externally thereto. Research on the fuel (reactant) of practical fuel cells mainly has focused on the use of methanol. However, when methanol is burned, formation of a poisoned by-product, for example, incompletely oxidized substances such as carbon monoxide and hydrocarbons, on the surface of an electrode catalyst is a problem. Thus, it is desirable to supply hydrogen, which is a clean fuel, to fuel cell electrodes. For the foregoing reasons, hydrogen supply or storage techniques are industrially very important. However, the stable supply or storage of hydrogen has been difficult so far because hydrogen is a gas at room temperature, has high reactivity and thus readily ignites in air, and so on.

For example, a method for storing hydrogen as a compressed gas is commonly used as a hydrogen storage method. However, this method is costly because it is necessary to overcome problems such as the safe transportation of compressed gas, hydrogen brittleness of container materials, and the like. Moreover, another hydrogen storage method is a method of storing hydrogen in the form of liquid hydrogen by liquefying hydrogen gas. However, this method has problems in that a great deal of energy is required in the step of liquefying hydrogen gas, a special and expensive container is required to store liquefied hydrogen, and so on. Still another hydrogen storage method is a method of storing hydrogen using a hydrogen storage alloy that absorbs hydrogen. However, hydrogen storage alloys have problems in that the repeated storage and release of hydrogen result in pulverization, and the pulverized hydrogen storage alloys are likely to suffer performance degradation; the hydrogen storage alloys are heavy, for example, and, therefore, are difficult to handle; a large amount of heat is produced and absorbed when the hydrogen storage alloys absorb and desorb hydrogen; and so on.

A possible method to solve these problems is a method of storing hydrogen in the form of a substance other than $H_2$. For example, formic acid (HCOOH) is known to generate hydrogen ($H_2$) and carbon dioxide ($CO_2$) when strongly heated. This property can be used to store hydrogen in the form of formic acid, which is a safe substance, and generate hydrogen by heating formic acid at appropriate temperature, thereby supplying hydrogen sustainably. It can be said that since formic acid is naturally available and also can be produced biologically, formic acid is effective as an environmentally-friendly hydrogen source that does not use fossil fuels. However, thermal decomposition of formic acid by simply heating formic acid has problems of cost and the like because a high temperature higher than the boiling point (101° C.) of formic acid and the melting point (253° C.) of sodium formate is required. Therefore, the development of a catalyst that is capable of efficiently generating hydrogen from formic acid under mild conditions has been sought.

Various catalysts for the decomposition of formic acid in which a metal complex is used previously have been researched (Non-Patent Documents 1 to 4 and the like), but those catalysts had problems in terms of the reactivity and the like of the catalysts, especially with the application of the catalysts to fuel cells. On the other hand, research on catalysts for the decomposition of formic acid that are solid catalysts recently has been conducted extensively in order to put-formic acid fuel cells to practical use. For example, Tekion, Inc., an affiliate of BASF, placed a formic acid fuel cell for mobile computers on the market for the first time in 2006 (Non-Patent Documents 5 and 6). However, these solid catalysts are expensive because high-priced precious metals, such as platinum, palladium, their alloys, or the like, are used (see Non-Patent Document 7, for example).

Non-Patent Document 1: Ford, P. C. et al., J. Am. Chem. Soc., 1977, 99, 252

Non-Patent Document 2: Otsuka, S. et al., J. Am. Chem. Soc., 1978, 100, 3941

Non-Patent Document 3: Lau, C. P. et al., Dalton, 2003, 3727

Non-Patent Document 4: Puddephatt, R. J. et al., Dalton, 2000, 3212; Chem. Commun., 1998, 2365

Non-Patent Document 5: [online] Mar. 13, 2006, BASF, [retrieved on Nov. 6, 2006], from the Internet <URL: http://www.corporate.basf.com/en/presse/mitteilungen/pm.htm?pmid=2188&id=V00-PCnAH9TaSbcp2Hn>

Non-Patent Document 6: [online], 2006, Tekion, Inc., [retrieved on Nov. 6, 2006], from the Internet <URL: http://www.tekion.com/main.htm>

Non-Patent Document 7: Masel, R. I. et al., Fuel Cells, 2004, 4, 337

DISCLOSURE OF INVENTION

It is an object of the present invention to provide a catalyst for the decomposition of formic acid that is capable of providing hydrogen ($H_2$) safely, efficiently, and at low cost.

The inventors of the present invention conducted in-depth research to solve the above-described problems and consequently found that a dinuclear metal complex represented by a formula (1) below is useful. More specifically, the catalyst for the decomposition of formic acid according to the present invention is a catalyst for the decomposition of formic acid including a dinuclear metal complex represented by the formula (1) below, a tautomer or stereoisomer thereof, or any of their salts.

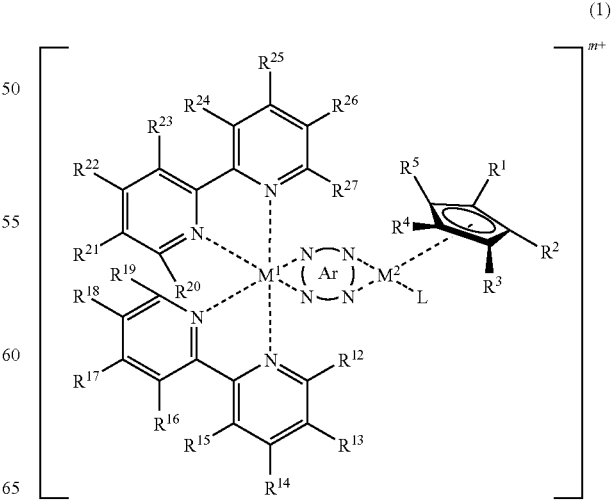

In the formula (1), $M^1$ and $M^2$ are transition metals and may be the same or different;

Ar is a ligand having aromaticity and may be unsubstituted or substituted by one or more substituents;

$R^1$ to $R^5$ are each independently a hydrogen atom, an alkyl group, a phenyl group, an acetyl group, or a cyclopentadienyl group;

$R^{12}$ to $R^{27}$ are each independently a hydrogen atom, an alkyl group, a phenyl group, a nitro group, a halogen group, a sulfonic acid group (sulfo group), an amino group, a carboxylic acid group (carboxy group), a hydroxy group, or an alkoxy group, or $R^{15}$ and $R^{16}$ together may form a —CH=CH—, that is, $R^{15}$ and $R^{16}$ may, together with a bipyridine ring to which $R^{15}$ and $R^{16}$ are bonded, form a phenanthroline ring, where Hs in the —CH=CH— may be each independently replaced by an alkyl group, a phenyl group, a nitro group, a halogen group, a sulfonic acid group (sulfo group), an amino group, a carboxylic acid group (carboxy group), a hydroxy group, or an alkoxy group, and $R^{23}$ and $R^{24}$ together may form a —CH=CH—, that is, $R^{23}$ and $R^{24}$ may, together with a bipyridine ring to which $R^{23}$ and $R^{24}$ are bonded, form a phenanthroline ring, where Hs in the —CH=CH— may be each independently replaced by an alkyl group, a phenyl group, a nitro group, a halogen group, a sulfonic acid group (sulfo group), an amino group, a carboxylic acid group (carboxy group), a hydroxy group, or an alkoxy group;

L is an arbitrary ligand or is absent; and m is a positive integer, 0, or a negative integer.

With the catalyst for the decomposition of formic acid according to the present invention, it is possible to provide hydrogen ($H_2$) safely and at low cost by the decomposition of formic acid, which is a stable and highly safe substance. Furthermore, the catalyst for the decomposition of formic acid according to the present invention efficiently can provide hydrogen due to its high reactivity for the decomposition of formic acid.

BEST MODE FOR CARRYING OUT THE INVENTION

Figure 1:
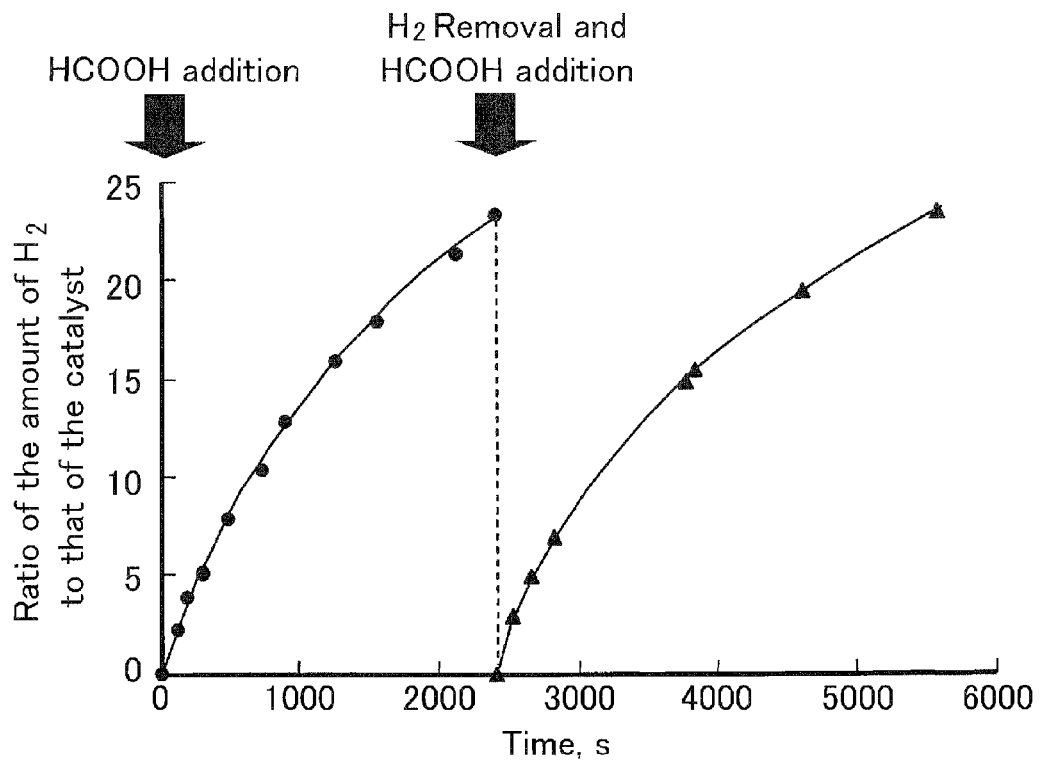
FIG. 1 is a graph showing the amount of hydrogen generated by formic acid decomposition using a catalyst of an example.

Hereinafter, embodiments of the present invention will be described. In the present invention, when numerical values are used to limit the scope of the invention, not only the precise range defined by those numerical values but also a range approximately defined by those numerical values is included. For example, "4 to 100° C." as used herein means not only the precise range of 4 to 100° C. but also an approximate range from about 4° C. to about 100° C. Moreover, the number of carbon atoms of "1 to 6" as used herein means both the precise range of 1 to 6 and an approximate range of about 1 to 6.

Dinuclear Metal Complex

In the dinuclear metal complex represented by the formula (1), the bridging ligand Ar is not particularly limited and may be any ligand.

In the formula (1), when Ar has one or more substituents, it is preferable that the substituents are each independently an alkyl group, a phenyl group, or a cyclopentadienyl group, and it is more preferable that the alkyl group is a linear or branched alkyl group having 1 to 6 carbon atoms.

In the formula (1), an alkyl group of $R^1$ to $R^5$ and $R^{12}$ to $R^{27}$ is preferably a linear or branched alkyl group having 1 to 6 carbon atoms. An alkoxy group of $R^{12}$ to $R^{27}$ is preferably a linear or branched alkoxy group having 1 to 6 carbon atoms, and particularly preferably a methoxy group. Moreover, it is particularly preferable that all of $R^1$ to $R^5$ are, for example, methyl groups, and it is particularly preferable that all of $R^{12}$ to $R^{27}$ are, for example, hydrogen atoms. Moreover, when $R^{15}$ and $R^{16}$ or $R^{23}$ and $R^{24}$ together form —CH=CH—, Hs of the —CH=CH— each independently may be replaced by an alkyl group, a phenyl group, a nitro group, a halogen group, a sulfonic acid group (sulfo group), an amino group, a carboxylic acid group (carboxy group), a hydroxy group, or an alkoxy group as described above, where the alkyl group is preferably a linear or branched alkyl group having 1 to 6 carbon atoms, and the alkoxy group is preferably a linear or branched alkoxy group having 1 to 6 carbon atoms, and particularly preferably a methoxy group.

Moreover, the dinuclear metal complex of the formula (1) is preferably a dinuclear metal complex having a structure represented by a formula (6) below.

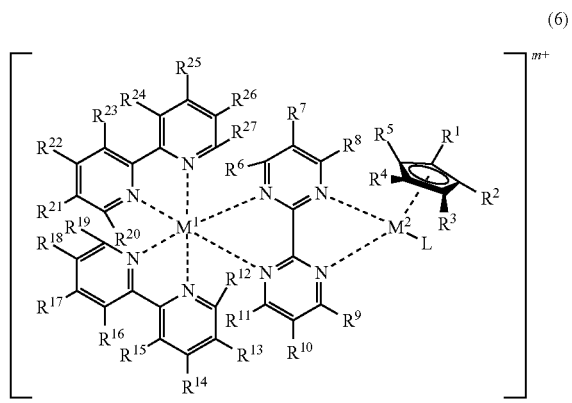

(6)

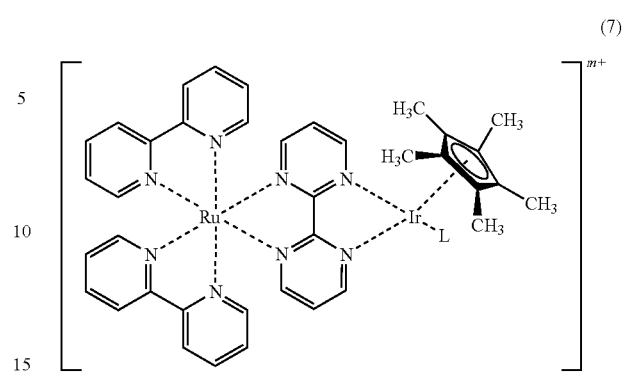

(7)

In the formula (6), $R^6$ to $R^{11}$ are each independently a hydrogen atom, an alkyl group, a phenyl group, a nitro group, a halogen group, a sulfonic acid group (sulfo group), an amino group, a carboxylic acid group (carboxy group), a hydroxy group, or an alkoxy group; and $M^1$, $M^2$, $R^1$ to $R^5$, $R^{12}$ to $R^{27}$, L and m are the same as those in the formula (1).

In the formula (6), an alkyl group of $R^1$ to $R^{27}$ is preferably a linear or branched alkyl group having 1 to 6 carbon atoms. An alkoxy group of $R^6$ to $R^{27}$ is preferably a linear or branched alkoxy group having 1 to 6 carbon atoms, and particularly preferably a methoxy group. Moreover, it is particularly preferable that all of $R^1$ to $R^5$ are, for example, methyl groups, and it is particularly preferable that all of $R^6$ to $R^{27}$ are, for example, hydrogen atoms.

Furthermore, concerning the dinuclear metal complex, tautomer or stereoisomer thereof, or any of their salts of the formula (1) or (6), it is preferable that L in the formula (1) or (6) is a water molecule, a hydrogen atom, an alkoxide ion, a hydroxide ion, a halide ion, a carbonate ion, a trifluoromethanesulfonate ion, a sulfate ion, a nitrate ion, a formate ion, or an acetate ion or is absent. Examples of the alkoxide ion include, but are not limited to, alkoxide ions derived from methanol, ethanol, n-propyl alcohol, isopropyl alcohol, n-butyl alcohol, sec-butyl alcohol, isobutyl alcohol, tert-butyl alcohol, and the like.

In some cases, the ligand L in the formula (1) or (6) may be substituted, removed, and so on relatively easily depending on the type thereof. For example, the ligand L is a water molecule in a basic, neutral, or weakly acidic aqueous solution, a hydrogen atom in a strongly acidic aqueous solution, and an alkoxide ion in an alcohol solvent, and may be removed by light or heat. However, the above description merely illustrates an example of possible mechanisms and is not to be construed as limiting the present invention.

In the formula (1) or (6), $M^1$ is preferably ruthenium, osmium, iron, manganese, chromium, cobalt, iridium, or rhodium, and ruthenium is particularly preferable. Moreover, $M^2$ is preferably iridium, ruthenium, rhodium, cobalt, osmium, or nickel, and iridium is particularly preferable. Furthermore, as for the combination of $M^1$ and $M^2$, it is particularly preferable that $M^1$ is ruthenium and $M^2$ is iridium.

In the formula (1) or (6), m is preferably 0 to 5 and more preferably 2, 3, or 4.

Among the dinuclear metal complexes represented by the formula (1), dinuclear metal complexes represented by a formula (7) below, for example, are even more preferable.

In the formula (7), L and m are the same as those in the formula (6). Moreover, among the dinuclear metal complexes represented by the formula (7), dinuclear metal complexes represented by any of formulae (8) to (11) below, for example, are particularly preferable.

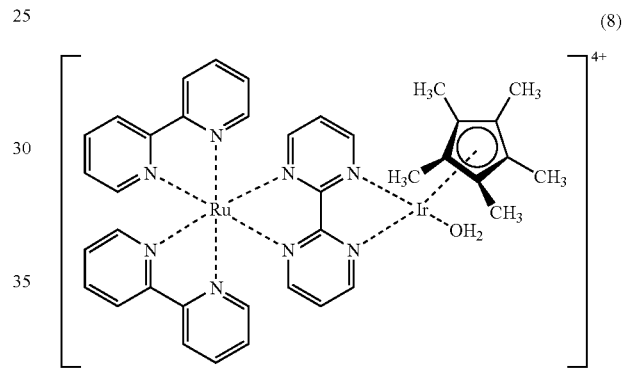

(8)

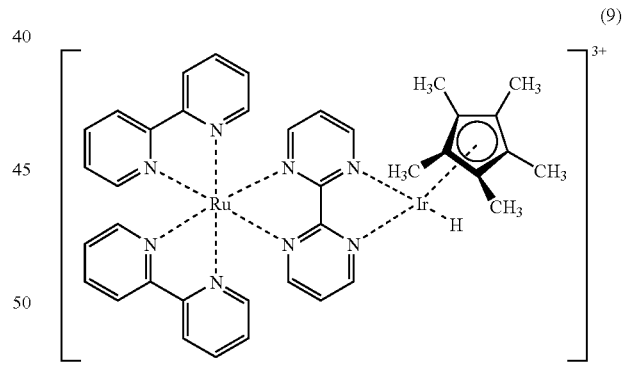

(9)

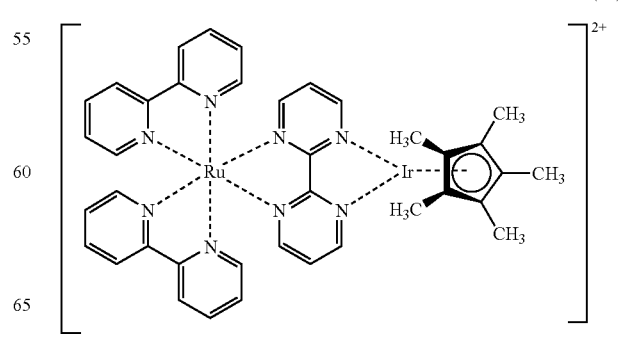

(10)

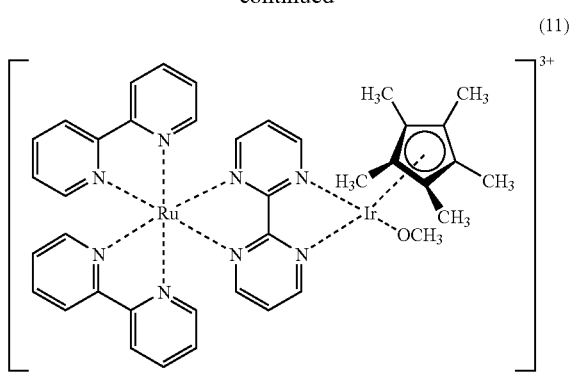

(11)

Note that among the dinuclear complexes represented by the formula (1), preferred dinuclear complexes other than those of the formula (7) are, for example, dinuclear complexes represented by compound numbers (31) to (60) in Tables 1 to 5 below. The structures of the individual compounds (31) to (60) are represented by a combination of $R^1$ to $R^{27}$, $M^1$, $M^2$, and Ar in the formula (1). Note that in the compounds (31) to (60), the ligand L is the same as that in the formula (1) or (6), and preferably the ligand L is, for example, but is not limited to, a water molecule, a hydrogen atom, a methoxide ion, or a hydroxide ion or is absent. Although m is determined based on the valence of $M^1$, the valence of $M^2$, and the charge of each ligand, it is preferable that m is, for example, 0 to 5. Moreover, all the compounds in Tables 1 to 5 below can be produced easily by any person skilled in the art based on the description of this specification and common knowledge in the technical field to which the present invention pertains without undue trial and error.

TABLE 1

| Compound No. | Substituent $R^1$ to $R^5$ | $R^6$ to $R^{27}$ | $M^1$ | $M^2$ | Ar |
|---|---|---|---|---|---|
| (31) | All hydrogen atoms | All hydrogen atoms | ruthenium | iridium | bipyrimidine |
| (32) | All methyl groups | All methyl groups | ruthenium | iridium | bipyrimidine |
| (33) | $R^1$ = methyl group $R^2$ to $R^5$ = hydrogen atoms | All hydrogen atoms | ruthenium | iridium | bipyrimidine |
| (34) | All methyl groups | All hydrogen atoms | ruthenium | iridium | bipyrimidine |
| (35) | $R^1$ = hydrogen atom $R^2$ to $R^5$ = methyl groups | All hydrogen atoms | ruthenium | iridium | bipyrimidine |
| (36) | All hydrogen atoms | All hydrogen atoms | ruthenium | iridium | bipyrimidine |
| (37) | All methyl groups | All methyl groups | ruthenium | iridium | bipyrimidine |
| (38) | $R^1$ = methyl group $R^2$ to $R^5$ = hydrogen atoms | All hydrogen atoms | ruthenium | iridium | bipyrimidine |
| (39) | All methyl groups | All hydrogen atoms | ruthenium | iridium | bipyrimidine |
| (40) | $R^1$ = hydrogen atom $R^2$ to $R^5$ = methyl groups | All hydrogen atoms | ruthenium | iridium | bipyrimidine |
| (41) | All hydrogen atoms | $R^{14}$, $R^{17}$, $R^{22}$, and $R^{25}$ = methyl groups $R^6$ to $R^{13}$, $R^{15}$, $R^{16}$, $R^{18}$ to $R^{21}$, $R^{23}$, $R^{24}$, $R^{26}$, and $R^{27}$ = hydrogen atoms | ruthenium | iridium | bipyrimidine |

TABLE 2

| Compound No. | Substituent $R^1$ to $R^5$ | $R^6$ to $R^{27}$ | $M^1$ | $M^2$ | Ar |
|---|---|---|---|---|---|
| (42) | All methyl groups | $R^{14}$, $R^{17}$, $R^{22}$, and $R^{25}$ = methyl groups $R^6$ to $R^{13}$, $R^{15}$, $R^{16}$, $R^{18}$ to $R^{21}$, $R^{23}$, $R^{24}$, $R^{26}$, and $R^{27}$ = hydrogen atoms | ruthenium | iridium | bipyrimidine |

TABLE 2-continued

| Compound No. | Substituent R¹ to R⁵ | R⁶ to R²⁷ | M¹ | M² | Ar |
|---|---|---|---|---|---|
| (43) | $R^1$ = methyl group $R^2$ to $R^5$ = hydrogen atoms | $R^{14}$, $R^{17}$, $R^{22}$, and $R^{25}$ = methyl groups $R^6$ to $R^{13}$, $R^{15}$, $R^{16}$, $R^{18}$ to $R^{21}$, $R^{23}$, $R^{24}$, $R^{26}$, and $R^{27}$ = hydrogen atoms | ruthenium | iridium | bipyrimidine |
| (44) | All methyl groups | $R^{14}$, $R^{17}$, $R^{22}$, and $R^{25}$ = methyl groups $R^6$ to $R^{13}$, $R^{15}$, $R^{16}$, $R^{18}$ to $R^{21}$, $R^{23}$, $R^{24}$, $R^{26}$, and $R^{27}$ = hydrogen atoms | ruthenium | iridium | bipyrimidine |
| (45) | $R^1$ = hydrogen atom $R^2$ to $R^5$ = methyl groups | $R^{14}$, $R^{17}$, $R^{22}$, and $R^{25}$ = methyl groups $R^6$ to $R^{13}$, $R^{15}$, $R^{16}$, $R^{18}$ to $R^{21}$, $R^{23}$, $R^{24}$, $R^{26}$, and $R^{27}$ = hydrogen atoms | ruthenium | iridium | bipyrimidine |

TABLE 3

| Compound No. | Substituent R¹ to R⁵ | R⁶ to R²⁷ | M¹ | M² | Ar |
|---|---|---|---|---|---|
| (46) | All hydrogen atoms | All hydrogen atoms | ruthenium | rhodium | bipyrimidine |
| (47) | All methyl groups | All methyl groups | ruthenium | rhodium | bipyrimidine |
| (48) | $R^1$ = methyl group $R^2$ to $R^5$ = hydrogen atoms | All hydrogen atoms | ruthenium | rhodium | bipyrimidine |
| (49) | All methyl groups | All hydrogen atoms | ruthenium | rhodium | bipyrimidine |
| (50) | $R^1$ = hydrogen atom $R^2$ to $R^5$ = methyl groups | All hydrogen atoms | ruthenium | rhodium | bipyrimidine |
| (50) | All hydrogen atoms | All hydrogen atoms | ruthenium | rhodium | bipyrimidine |
| (51) | All methyl groups | All methyl groups | ruthenium | rhodium | bipyrimidine |
| (53) | $R^1$ = methyl group $R^2$ to $R^5$ = hydrogen atoms | All hydrogen atoms | ruthenium | rhodium | bipyrimidine |
| (54) | All methyl groups | All hydrogen atoms | ruthenium | rhodium | bipyrimidine |

TABLE 4

| Compound No. | Substituent R¹ to R⁵ | R⁶ to R²⁷ | M¹ | M² | Ar |
|---|---|---|---|---|---|
| (55) | $R^1$ = hydrogen atom $R^2$ to $R^5$ = methyl groups | All hydrogen atoms | ruthenium | rhodium | bipyrimidine |

TABLE 4-continued

| Compound No. | Substituent | | | | |
|---|---|---|---|---|---|
| | $R^1$ to $R^5$ | $R^6$ to $R^{27}$ | $M^1$ | $M^2$ | Ar |
| (56) | All hydrogen atoms | $R^{14}$, $R^{17}$, $R^{22}$, and $R^{25}$ = methyl groups $R^6$ to $R^{13}$, $R^{15}$, $R^{16}$, $R^{18}$ to $R^{21}$, $R^{23}$, $R^{24}$, $R^{26}$, and $R^{27}$ = hydrogen atoms | ruthenium | rhodium | bipyrimidine |
| (57) | All methyl groups | $R^{14}$, $R^{17}$, $R^{22}$, and $R^{25}$ = methyl groups $R^6$ to $R^{13}$, $R^{15}$, $R^{16}$, $R^{18}$ to $R^{21}$, $R^{23}$, $R^{24}$, $R^{26}$, and $R^{27}$ = hydrogen atoms | ruthenium | rhodium | bipyrimidine |

TABLE 5

| Compound No. | Substituent | | | | |
|---|---|---|---|---|---|
| | $R^1$ to $R^5$ | $R^6$ to $R^{27}$ | $M^1$ | $M^2$ | Ar |
| (58) | $R^1$ = methyl group $R^2$ to $R^5$ = hydrogen atoms | $R^{14}$, $R^{17}$, $R^{22}$, and $R^{25}$ = methyl groups $R^6$ to $R^{13}$, $R^{15}$, $R^{16}$, $R^{18}$ to $R^{21}$, $R^{23}$, $R^{24}$, $R^{26}$, and $R^{27}$ = hydrogen atoms | ruthenium | rhodium | bipyrimidine |
| (59) | All methyl groups | $R^{14}$, $R^{17}$, $R^{22}$, and $R^{25}$ = methyl groups $R^6$ to $R^{13}$, $R^{15}$, $R^{16}$, $R^{18}$ to $R^{21}$, $R^{23}$, $R^{24}$, $R^{26}$, and $R^{27}$ = hydrogen atoms | ruthenium | rhodium | bipyrimidine |
| (60) | $R^1$ = hydrogen atom $R^2$ to $R^5$ = methyl groups | $R^{14}$, $R^{17}$, $R^{22}$, and $R^{25}$ = methyl groups $R^6$ to $R^{13}$, $R^{15}$, $R^{16}$, $R^{18}$ to $R^{21}$, $R^{23}$, $R^{24}$, $R^{26}$, and $R^{27}$ = hydrogen atoms | ruthenium | rhodium | bipyrimidine |

When a dinuclear complex represented by the formula (1) has an isomer, such as a tautomer or a stereoisomer (e.g., a geometrical-isomer, a conformational isomer, and an optical isomer), the isomer also can be used in the present invention. For example, when the dinuclear complex has enantiomers, both the R-form and the S-form can be used. Furthermore, a salt of the dinuclear complex represented by the formula (1) or a salt of an isomer of the dinuclear complex represented by the formula (1) also can be used in the present invention. In the salt, although there is no particular limitation on a counterion for the dinuclear complex represented by the formula (1), examples of an anion that can be the counterion include a hexafluorophosphate ion ($PF_6^-$), a tetrafluoroborate ion ($BF_4^-$), a hydroxide ion ($OH^-$), an acetate ion, a carbonate ion, a phosphate ion, a sulfate ion, a nitrate ion, a halide ion (e.g., a fluoride ion ($F^-$), a chloride ion ($Cl^-$), a bromide ion ($Br^-$), and an iodide ion ($I^-$)), a hypohalite ion (e.g., a hypofluorite ion, a hypochlorite ion, a hypobromite ion, and a hypoiodite ion), a halite ion (e.g., a fluorite ion, a chlorite ion, a bromite ion, and an iodite ion), a halate ion (e.g., a fluorate ion, a chlorate ion, a bromate ion, and an iodate ion), a perhalate ion (e.g., a perfluorate ion, a perchlorate ion, a perbromate ion, and a periodate ion), a trifluoromethane-sulfonate ion ($OSO_2CF_3^-$), and a tetrakis(pentafluorophenyl)borate ion [$B(C_6F_5)_4^-$]. Examples of a cation that can be the counterion include, but are not limited to, various metal ions, such as a lithium ion, a magnesium ion, a sodium ion, a potassium ion, a calcium ion, a barium ion, a strontium ion, an yttrium ion, a scandium ion, and a lanthanoid ion; and a hydrogen ion. Although these counterions may be present alone, two or more of these counterions can be concomitantly present.

Note that in the present invention, examples of the alkyl group include, but are not limited to, a methyl group, an ethyl group, an n-propyl group, an isopropyl group, an n-butyl group, an isobutyl group, a sec-butyl group, and a tert-butyl group, a pentyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, and an icosyl group. In a group and a group of atoms (an alkoxy group and the like) derived from an alkyl group and a group, examples of the alkyl group are similarly. Examples of the alcohol and the alkoxide ion include, but are not limited to, alcohols and alkoxide ions derived from the aforementioned various alkyl groups. Moreover, "halogen" as referred to in the present invention indicates an arbitrary halogen element, and examples thereof include fluorine, chlorine, bromine, and iodine. Furthermore, in the present invention, when a substituent or the like has an isomer, any isomer can be used unless otherwise specified. For example, a "propyl group" as simply referred to herein can indicate either of an n-propyl group and an isopropyl group. Also, a "butyl group" as simply referred to herein can indicate any of an n-butyl group, an isobutyl group, a sec-butyl group, and a tert-butyl group.

Process for Producing Dinuclear Metal Complex

There is no particular limitation on the process for producing the dinuclear metal complex represented by the formula (1), tautomer or stereoisomer thereof, or any of their salts (hereinafter sometimes referred to simply as a "compound (1)"), and any production process can be used. However, it is preferable that a production process that includes a step of reacting a metal complex represented by a formula (21) below, a tautomer or stereoisomer thereof, or any of their salts (hereinafter sometimes referred to simply as a "compound (21)") with a metal complex represented by a formula (22) below, a tautomer or stereoisomer thereof, or any of their salts (hereinafter sometimes referred to simply as a "compound (22)") by dissolving these compounds in a solvent. This production process may include, for example, only generation of the compound (1) by the aforementioned reaction step, or it further may include a subsequent step of isolating the compound (1) using an appropriate method. With such a process, the compound (1) can be produced in a simple manner.

In the formula (21),

Ar, $M^1$, and $R^{12}$ to $R^{27}$ are the same as those in the formula (1); and n is a positive integer, 0, or a negative integer, and in the formula (22), $M^2$, L, and $R^1$ to $R^5$ are the same as those in the formula (1);

$L^1$ and $L^2$ are arbitrary substituents or are absent, and may be the same or different; and p is a positive integer, 0, or a negative integer.

Note that, in the formula (22), it is preferable that, for example, all of L, $L^1$, and $L^2$ are water molecules. Moreover, in the case where the metal complex (21) or the metal complex (22), or any of their isomers forms a salt, there is no limitation on a counterion therefor, but examples of the counterion are, for example, the same as the specific examples described hereinbefore with respect to the counterion for the dinuclear metal complex of the formula (1).

In the process for producing the compound (1), there is no particular limitation on the solvent for dissolving the compound (21) and the compound (22). For example, both water and an organic solvent can be used as the solvent, and one solvent may be used alone or two or more solvents may be used in combination. For example, when both of the compound (21) and the compound (22) are soluble in water, it is simpler, and therefore preferable, to use water. Although there is no particular limitation on the organic solvent, a highly polar solvent is preferable in view of the solubility and the like of the compound (21) and the compound (22). Examples of such a highly polar solvent include a nitrile such as acetonitrile, propionitrile, butyronitrile, benzonitrile; a primary alcohol such as methanol, ethanol, n-propyl alcohol, or n-butyl alcohol; a secondary alcohol such as isopropyl alcohol or s-butyl alcohol; a tertiary alcohol such as t-butyl alcohol; a polyhydric alcohol such as ethylene glycol or propylene glycol; an ether such as tetrahydrofuran, dioxane, dimethoxyethane, or diethyl ether; an amide such as dimethylformamide or dimethylacetamide; a sulfoxide such as dimethyl sulfoxide; and an ester such as ethyl acetate.

When dissolving the compound (21) and the compound (22) in the solvent, there is no particular limitation on the concentration of the molecules of the complex (21), but the concentration of complex (21) molecules is, for example, 0.001 to 50 mmol/L, preferably 0.005 to 20 mmol/L, and more preferably 0.01 to 5 mmol/L. Similarly, there is no particular limitation on the concentration of the molecules of the complex (22), but the concentration of complex (22) molecules is, for example, 0.001 to 50 mmol/L, preferably 0.005 to 20 mmol/L, and more preferably 0.01 to 5 mmol/L. There is also no particular limitation on the ratio of the amount (the number of molecules) of complex (21) molecules to the amount (the number of molecules) of complex (22) molecules, but this ratio is, for example, 1:100 to 100:1, preferably 1:50 to 50:1, more preferably 1:3 to 3:1, and particularly preferably 1:1, which is equal to the stoichiometric ratio.

Also, there is no particular limitation on the method for reacting the compound (21) with the compound (22), but, for example, after dissolving these compounds in the solvent, the solution may be allowed to stand at room temperature as it is or may be heated as necessary. Specifically, although there is no particular limitation on the reaction temperature, the reaction temperature is, for example, 4 to 100° C., preferably 20 to 80° C., and more preferably 20 to 60° C. Similarly, although there is no particular limitation on the reaction time, the reaction time is, for example, 5 seconds to 60 minutes, preferably 10 seconds to 10 minutes, and more preferably 10 seconds to 1 minute. Ideally, it is advantageous that the reac-

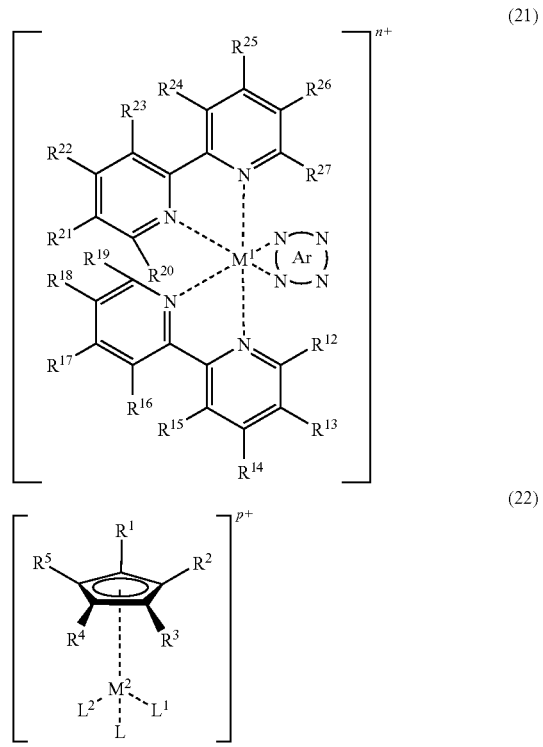

tion is completed immediately after the compound (21) and the compound (22) are mixed.

In the process for producing the compound (1), there is also no particular limitation on the method for isolating the compound (1). However, for example, a known method for isolating a metal complex, such as recrystallization or counter anion exchange and precipitation, can be applied as appropriate.

Catalyst for Decomposition of Formic Acid, Method for Decomposing Formic Acid, Process for Producing Hydrogen, Apparatus for Producing and Decomposing Formic Acid, and Method for Storing and Generating Hydrogen According to the Present Invention The catalyst for the decomposition of formic acid according to the present invention is a catalyst for the decomposition of formic acid containing the dinuclear metal complex represented by the formula (1), tautomer or stereoisomer thereof, or any of their salts (the compound (1)). For example, the compound (1) may be used as the catalyst for the decomposition of formic acid of the present invention as it is, or the compound (1) to which another component is added as appropriate may be used. The catalyst for the decomposition of formic acid according to the present invention decomposes formic acid by its own action to generate hydrogen ($H_2$) and carbon dioxide ($CO_2$).

The method for decomposing formic acid according to the present invention includes at least one step selected from the group consisting of the steps of allowing a solution containing the catalyst for the decomposition of formic acid according to the present invention and formic acid to stand as it is, heating the solution, and irradiating the solution with light. That is to say, for example, formic acid is added to a solution of the compound (1), and the resultant solution is allowed to stand as it is, or is heated or irradiated with light as necessary. In the case where the solution is heated, there is no particular limitation on the temperature, but the heating temperature is, for example, 4 to 100° C., preferably 10 to 80° C., and more preferably 20 to 40° C. There is also no particular limitation on the method for collecting generated hydrogen, and, for example, a known method such as collection over water or upper delivery can be used as appropriate.

In the method for decomposing formic acid according to the present invention, there is no particular limitation on the solvent. For example, both water and an organic solvent can be used as the solvent, and one solvent may be used alone or two or more solvents may be used in combination. In the case where the compound (1) is soluble in water, it is simpler, and therefore preferable, to use water. There is no particular limitation on the organic solvent, but a highly polar solvent is preferable in view of the solubility and the like of the compound (1), and examples thereof include a nitrile such as acetonitrile, propionitrile, butyronitrile, or benzonitrile; a primary alcohol such as methanol, ethanol, n-propyl alcohol, or n-butyl alcohol; a secondary alcohol such as isopropyl alcohol or s-butyl alcohol; a tertiary alcohol such as t-butyl alcohol; a polyhydric alcohol such as ethylene glycol or propylene glycol; an ether such as tetrahydrofuran, dioxane, dimethoxyethane, or diethyl ether; an amide such as dimethylformamide or dimethylacetamide; a sulfoxide such as dimethyl sulfoxide; and an ester such as ethyl acetate. Furthermore, formic acid, which is the raw material, may be in the form of a solution, a salt, or the like.

In the method for decomposing formic acid according to the present invention, there is no particular limitation on the concentration of the molecules of the dinuclear metal complex (1) in the solution, but the concentration is, for example, 0.001 to 50 mmol/L, preferably 0.005 to 20 mmol/L, and more preferably 0.005 to 5 mmol/L. There is also no particular limitation on the ratio of the amount (the number of molecules) of dinuclear metal complex (1) molecules to the amount (the number of molecules) of formic acid molecules, but this ratio is, for example, 100:1 to 1:1000, preferably 10:1 to 1:500, and more preferably 1:1 to 1:500.

The process for producing hydrogen ($H_2$) according to the present invention includes a step of generating hydrogen ($H_2$) by decomposing formic acid by the method for decomposing formic acid according to the present invention. Thus, it is possible to supply hydrogen sustainably under mild conditions at, for example, room temperature using formic acid, which is a safe substance, as the raw material. Moreover, when hydrogen ($H_2$) is generated by formic acid decomposition, carbon dioxide ($CO_2$) is formed as a by-product. Therefore, the method for decomposing formic acid according to the present invention can also be used in a process for producing carbon dioxide ($CO_2$). That is to say, this process for producing carbon dioxide ($CO_2$) includes a step of generating carbon dioxide ($CO_2$) by decomposing formic acid by the method for decomposing formic acid according to the present invention. Note that the process for producing hydrogen ($H_2$) according to the present invention does not involve a by-product other than carbon dioxide ($CO_2$), so it is also possible to obtain hydrogen without forming a toxic by-product.

Next, the apparatus for producing and decomposing formic acid according to the present invention includes a formic acid decomposing portion for generating hydrogen ($H_2$) and carbon dioxide ($CO_2$) by decomposing formic acid and a formic acid producing portion for producing formic acid from hydrogen ($H_2$) and carbon dioxide ($CO_2$), the formic acid decomposing portion containing the catalyst for the decomposition of formic acid according to the present invention, and the formic acid producing portion containing a catalyst for the production of formic acid to be used to produce formic acid by reacting hydrogen ($H_2$) with carbon dioxide ($CO_2$). There is no limitation on the specific structure of this apparatus, but the apparatus further may include, for example, a carbon dioxide supplying portion for supplying carbon dioxide generated from the formic acid decomposing portion to the formic acid producing portion. The apparatus further may include, for example, a formic acid supplying portion for supplying formic acid produced in the formic acid producing portion to the formic acid decomposing portion. Assuming this configuration, formic acid can be produced again from carbon dioxide that is the by-product from formic acid decomposition, so carbon dioxide ($CO_2$) can be recycled without being released into the atmosphere. Moreover, the method for storing and generating hydrogen according to the present invention includes a hydrogen storing step of producing formic acid by reacting hydrogen ($H_2$) with carbon dioxide ($CO_2$) using a catalyst for the production of formic acid, and storing the hydrogen in the form of formic acid; and a hydrogen generating step of generating hydrogen ($H_2$) and carbon dioxide ($CO_2$) by decomposing formic acid using the catalyst for the decomposition of formic acid according to the present invention. There is no particular limitation on the order in which the hydrogen storing step and the hydrogen generating step are performed, and either step may be performed first. Moreover, after each of these steps is performed once, the method may return to the first step. There is no particular limitation on an apparatus to be used to perform the method for storing and generating hydrogen according to the present invention, but, for example, the apparatus for producing and decomposing formic acid according to the present invention can be used to perform this method.

For example, the method for storing and generating hydrogen according to the present invention can be performed in the following manner. That is, first, the apparatus for producing and decomposing formic acid according to the present invention is prepared. This apparatus includes a carbon dioxide supplying portion for supplying carbon dioxide generated from the formic acid decomposing portion to the formic acid producing portion, a formic acid supplying portion for supplying formic acid produced in the formic acid producing portion to the formic acid decomposing portion, and a hydrogen supplying portion for supplying hydrogen to the formic acid producing portion. Next, hydrogen is supplied from the hydrogen supplying portion to the formic acid producing portion, and carbon dioxide generated from the formic acid decomposing portion is supplied to the formic acid producing portion via the carbon dioxide supplying portion. Then, in the formic acid producing portion, formic acid is produced by reacting hydrogen ($H_2$) with carbon dioxide ($CO_2$) using the catalyst for the production of formic acid, whereby the hydrogen is stored in the form of formic acid. This formic acid can be used after storage for an arbitrary amount of time, but it may be used immediately, if necessary. Then, the above formic acid is supplied to the formic acid decomposing portion via the formic acid supplying portion, and the formic acid is decomposed using the catalyst for the decomposition of formic acid according to the present invention to generate hydrogen ($H_2$) and carbon dioxide ($CO_2$). The hydrogen generated can be used in any application and, for example, can be used in fuel cells or the like. Then, carbon dioxide, which is the by-product, is supplied to the formic acid producing portion via the carbon dioxide supplying portion and used again in the production of formic acid. There is no particular limitation on the hydrogen supplying portion for supplying hydrogen to the formic acid producing portion, but, for example, the hydrogen supplying portion may include a known hydrogen cylinder or the like. With the method for storing and generating hydrogen according to the present invention or the apparatus for producing and decomposing formic acid according to the present invention, hydrogen can be stored and transported as formic acid or a formate, and as much hydrogen as necessary can be used safely where and when needed. This has an advantage in safety and the like over transporting a hydrogen cylinder or the like and supplying hydrogen directly from the hydrogen cylinder or the like when needed.

There is no particular limitation on the catalyst for the production of formic acid used in the method for storing and generating hydrogen according to the present invention or the apparatus for producing and decomposing formic acid according to the present invention, but, for example, catalysts for the production of formic acid invented by the inventors of the present invention and disclosed in reference literatures (a) to (c) below are preferable. The catalysts for the production of formic acid are represented by a formula (23) or (24) below. In the formula (23) below, $X^1$ is $H_2o$ (a water molecule) or H (a hydrogen atom), and Q is 3 when $X^1$ is $H_2o$ and Q is 2 when $X^1$ is H. $R^{100}$ and $R^{200}$ are each independently a hydrogen atom or a methoxy group. In the formula (24), $X^2$ is $H_2o$ (a water molecule) or H (a hydrogen atom), and T is 2 when $X^2$ is $H_2o$ and T is 1 when $X^2$ is H. $R^{300}$ and $R^{400}$ are each independently a hydrogen atom or a methoxy group. However, in the formulae (23) and (24) below, $X^1$, $X^2$, $R^{100}$, $R^{200}$, $R^{300}$, and $R^{400}$ may be replaced by another group of atoms as long as the function of a catalyst for the production of formic acid is not impaired, and, for example, $R^{100}$, $R^{200}$, $R^{300}$, or $R^{400}$ may be another alkoxy group, an alkyl group, or the like. Moreover, in the pentamethylcyclopentadienyl group in the formula (23) or the hexamethylbenzene group in the formula (24), each methyl group may be replaced by another group of atoms as long as the function of a catalyst for the production of formic acid is not impaired, and, for example, the methyl groups may be each independently another alkyl group, an alkoxy group, a hydrogen atom, or the like. Unlike previous catalysts for the production of formic acid, the catalysts for the production of formic acid represented by the formulae (23) and (24) below are characterized by their high reactivity under acidic conditions. Thus, the formic acid produced can be used in the form of a free acid instead of a salt, and so those catalysts are preferable in view of the simplicity of operation and the like. Moreover, although there is also no limitation on the process for producing the catalysts for the production of formic acid represented by the formulae (23) and (24) below, these catalysts can be produced easily by any person skilled in the art based on the description of the specification of the present application and common technical knowledge. For example, the catalysts of the formulae (23) and (24) may be produced in accordance with the process for producing the catalyst for the decomposition of formic acid according to the present invention. That is to say, for example, out of the catalysts represented by the formula (23), an aqua complex can be synthesized by a method of mixing a bipyridine ligand into an aqueous solution of $[Cp^*Ir(OH_2)_3]^{2+}$ ($Cp^*$ is a pentamethylcyclopentadienyl group), and a hydride complex can be generated by adding formic acid or $H_2$ to the aqua complex. These production processes are described in detail in the reference literatures (a) to (c) and so on.

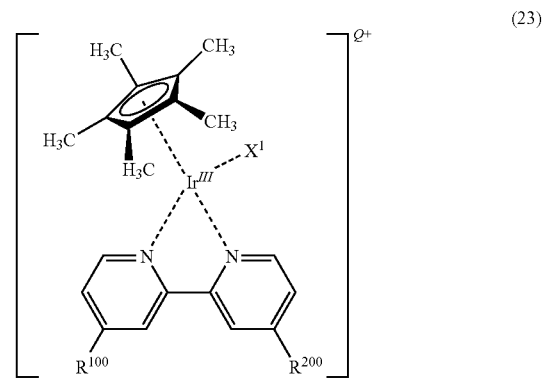

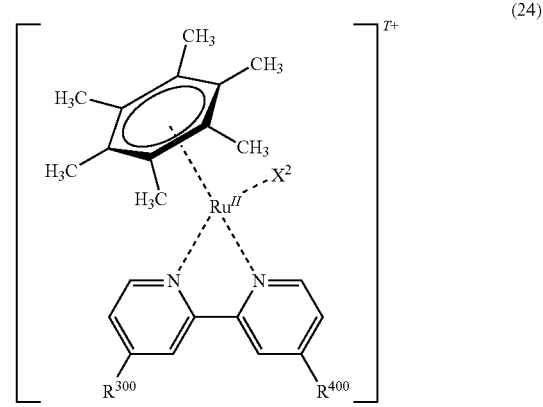

(a) Hideki Hayashi, Seiji Ogo, and Shunichi Fukuzumi, Chem. Commun., 2004, 2714-2715

(b) Seiji Ogo, Ryota Kabe, Hideki Hayashi, Ryosuke Harada, and Shunichi Fukuzumi, Dalton Trans., 2006, 4657-4663

(c) Hideki Hayashi, Seiji Ogo, Tsutomu Abura, and Shunichi Fukuzumi, Journal of American Chemical Society, 2003, 125, 14266-14267

A process stated in the reference literature (b) will be described to illustrate an example of the process for producing the catalyst for the production of formic acid represented by the formula (23) or (24).

A sulfate $[(\eta^6-C_6Me_6)Ru^{II}(4,4'\text{-OMe-bpy})(OH_2)]SO_4$ of $[(\eta^6-C_6Me_6)Ru^{II}(4,4'\text{-OMe-bpy})(OH_2)]^{2+}$ (a catalyst for the production of formic acid represented by the formula (24), where $X^2$ is $H_2O$ (a water molecule), $R^{300}$ and $R^{400}$ are methoxy groups, and T=2) can be produced in the following manner. That is, first, 4,4'-dimethoxy-2,2'-bipyridine (105 mg, 0.486 mmol) is added to an aqueous solution (20 cm$^3$) of $[(\eta^6-C_6Me_6)Ru^{II}(OH_2)_3]SO_4$ (200 mg, 0.484 mmol). The solution was stirred at room temperature for 24 hours to obtain a light-brown solution. After a trace amount of impurities is filtered out, the filtrate is evaporated under reduced pressure to yield the objective substance $[(\eta^6-C_6Me_6)Ru^{II}(4,4'\text{-OMe-bpy})(OH_2)]SO_4$, which is vacuum dried and used (yield: 98%, calculated based on $[(\eta^6-C_6Me_6)Ru^{II}(OH_2)_3]SO_4$). Here are the values obtained by instrumental analysis of $[(\eta^6-C_6Me_6)Ru^{II}(4,4'\text{-OMe-bpy})(OH_2)]SO_4$.

$[(\eta^6-C_6Me_6)Ru^{II}(4,4'\text{-OMe-bpy})(OH_2)]SO_4$:

$^1$H NMR (300 MHz, H$_2$O, 25° C.) δ (TSP in D$_2$O, ppm) 2.12 (s, $\eta^6$-C$_6$(CH$_3$)$_6$, 18H), 4.08 (s, OCH$_3$, 6H), 7.42 (dd, J=6.6, 2.6 Hz, bpy, 2H), 7.86 (d, J=2.6 Hz, bpy, 2H), 8.91 (d, J=6.6 Hz, bpy, 2H).

Moreover, when an aqueous solution (1 cm$^3$) of NaPF$_6$ (168 mg, 1.00 mmol) is added to an aqueous solution (5 cm$^3$) of this sulfate $[(\eta^6-C_6Me_6)Ru^{II}(4,4'\text{-OMe-bpy})(OH_2)]SO_4$ (64.7 mg, 0.10 mmol), a hexafluorophosphate $[(\eta^6-C_6Me_6)Ru^{II}(4,4'\text{-OMe-bpy})(OH_2)](PF_6)_2$ in the form of an orange powder is precipitated. Recrystallization of this powder in methanol gives crystals of the hexafluorophosphate $[(\eta^6-C_6Me_6)Ru^{II}(4,4'\text{-OMe-bpy})(OH_2)](PF_6)_2$. Here are the values obtained by elemental analysis of this hexafluorophosphate.

$[(\eta^6-C_6Me_6)Ru^{II}(4,4'\text{-OMe-bpy})(OH_2)](PF_6)_2$:

Elemental analysis: $[(\eta^6-C_6Me_6)Ru^{II}(4,4'\text{-OMe-bpy})(OH_2)](PF_6)_2$—H$_2$O: C$_{24}$H$_{34}$N$_2$F$_{12}$O$_4$P$_2$Ru: theoretical value: C, 35.79; H, 4.25; N, 3.48%. Observed value: C, 35.85; H, 4.31; N, 3.44%.

A sulfate $[Cp^*Ir^{III}(4,4'\text{-OMe-bpy})(OH_2)]SO_4$ of $[Cp^*Ir^{III}(4,4'\text{-OMe-bpy})(OH_2)]^{2+}$ (a catalyst for the production of formic acid represented by the formula (23), where $X^1$ is $H_2O$ (a water molecule), $R^{100}$ and $R^{200}$ are methoxy groups, and Q=2) can be produced in the following manner. That is, first, 4,4'-dimethoxy-2,2'-bipyridine (324 mg, 1.50 mmol) is added to an aqueous solution (25 cm$^3$) of $[Cp^*Ir^{III}(OH_2)_3]SO_4$ (717 mg, 1.50 mmol). The solution is stirred at room temperature for 12 hours to obtain a yellow solution. After a trace amount of precipitate is filtered out, the filtrate is evaporated under reduced pressure to yield the objective substance $[Cp^*Ir^{III}(4,4'\text{-OMe-bpy})(OH_2)]SO_4$, which is vacuum dried and used (yield: 96%, calculated based on $[Cp^*Ir^{III}(OH_2)_3]SO_4$). Here are the values obtained by instrumental analysis of $[Cp^*Ir^{III}(4,4'\text{-OMe-bpy})(OH_2)]SO_4$.

$[Cp^*Ir^{III}(4,4'\text{-OMe-bpy})(OH_2)]SO_4$:

$^1$H NMR (300 MHz, H$_2$O, 25° C.) δ (TSP in D$_2$O, ppm): 1.67 (s, $\eta^5$-C$_5$(CH$_3$)$_5$, 15H), 4.11 (s, OCH$_3$, 6H), 7.40 (dd, J=6.6, 2.6 Hz, bpy, 2H), 7.97 (d, J=2.6 Hz, bpy, 2H), 8.89 (d, J=6.6 Hz, bpy, 2H).

Moreover, when an aqueous solution (0.5 cm$^3$) of sodium trifluoromethanesulfonate NaOTf (172 mg, 1.5 mmol) is added to an aqueous solution (1 cm$^3$) of this sulfate $[Cp^*Ir^{III}(4,4'\text{-OMe-bpy})(OH_2)]SO_4$, a trifluoromethanesulfonate $[Cp^*Ir^{III}(4,4'\text{-OMe-bpy})(OH_2)](OTf)_2$ in the form of a yellow powder is precipitated. Recrystallization of this powder in water gives a single crystal of the trifluoromethanesulfonate $[Cp^*Ir^{III}(4,4'\text{-OMe-bpy})(OH_2)](OTf)_2$. Here are the values obtained by elemental analysis of the trifluoromethanesulfonate salt $[Cp^*Ir^{III}((4,4'\text{-OMe-bpy})(OH_2)](OTf)_2$.

$[Cp^*Ir^{III}(4,4\text{-OMe-bpy})(OH_2)](OTf)_2$:

Elemental analysis: $[Cp^*Ir^{III}(4,4'\text{-OMe-bpy})(OH_2)](OTf)_2$: C$_{24}$H$_{29}$N$_2$F$_6$O$_9$S$_2$Ir: theoretical value: C, 33.53; H, 3.40; N, 3.26%. Observed value: C, 33.47; H, 3.36; N, 3.37%.

A hexafluorophosphate salt $[Cp^*Ir^{III}(4,4'\text{-OMe-bpy})H]PF_6$ of $[Cp^*Ir^{III}(4,4'\text{-OMe-bpy})H]^+$ (a catalyst for the production of formic acid represented by the formula (23), where $X^1$ is a hydrogen atom (hydride ligand), $R^{100}$ and $R^{200}$ are methoxy groups, and Q=1) can be produced in the following manner. That is, first, a citrate buffer solution (pH 3.0, 20 cm$^3$, pale yellow) of $[Cp^*Ir^{III}(4,4'\text{-OMe-bpy})(OH_2)]SO_4$ (13.1 mg, 20.0 μmol) is maintained under pressurized conditions (5.5 MPa) while blowing H$_2$ into the solution. Under these conditions, the solution is allowed to react for 12 hours at 40° C. to obtain a red solution of $[Cp^*Ir^{III}(4,4'\text{-OMe-bpy})H]^+$.

When NaPF$_6$ (16.7 mg, 0.1 mmol) is added to the red solution (aqueous solution at pH 3.0) of $[Cp^*Ir^{III}(4,4'\text{-OMe-bpy})H]^+$, an air-stable hexafluorophosphate $[Cp^*Ir^{III}(4,4'\text{-OMe-bpy})H]PF_6$ is precipitated as a yellow powder, which is vacuum dried and used (yield: 77%, calculated based on $[Cp^*Ir^{III}(4,4'\text{-OMe-bpy})(OH_2)]SO_4$). Here are the values obtained by instrumental analysis of the hexafluorophosphate $[Cp^*Ir^{III}(4,4'\text{-OMe-bpy})H]PF_6$.

Hexafluorophosphate $[Cp^*Ir^{III}(4,4'\text{-OMe-bpy})H]PF_6$:

$^1$H NMR (300 MHz, DMSO-d$_6$, 25° C.) δ (TMS, ppm): −11.25 (s, Ir—H, 1H), 1.79 (s, $\eta^5$-C$_5$(CH$_3$)$_5$, 15H), 4.06 (s, OCH$_3$, 6H), 7.33 (dd, J=6.6, 2.6 Hz, bpy, 2H), 8.33 (d, J=2.6 Hz, bpy, 2H), 8.65 (d, J=6.6 Hz, bpy, 2H).

ESI-MS (in H$_2$O), m/z 545.2 {$[Cp^*Ir^{III}(4,4'\text{-OMe-bpy})H]^+$; relative intensity (I)=100% in the range of m/z 100-2000}.

FT-IR (KBr, cm$^{-1}$) 2030 (Ir—H).

Furthermore, there is also no particular limitation on the method for using the catalysts for the production of formic acid represented by the formulae (23) and (24). For example, these catalysts are dissolved in an appropriate solvent, hydrogen and carbon dioxide are supplied into the solution to cause a catalytic reaction, and formic acid thus can be produced. Therefore, the formic acid producing portion of the apparatus for producing and decomposing formic acid according to the present invention can be created by, for example, filling a suitable container with a solution of a catalyst for the production of formic acid represented by the formula (23) or (24). There is no particular limitation on the solvent. For example, water or an organic solvent can be used, and both a single solvent alone and a mixed solvent can be used. Particularly preferably, the solvent is water in view of the solubility of the catalysts for the production of formic acid represented by the formulae (23) and (24), the simplicity of the reaction, the reactivity of hydrogen and carbon dioxide, and the like. Although there is no particular limitation on the reaction temperature for the catalytic reaction, the reaction temperature is, for example, 4 to 100° C., preferably 10 to 80° C., and particularly preferably 20 to 60° C. There is also no particular limitation on the reaction time, but the reaction time is, for example, 1 to 80 minutes, preferably 2 to 30 minutes, and particularly preferably 2 to 10 minutes. There is no particular limitation on the internal pressure of the hydrogen (H$_2$) in the reaction system, but the internal pressure of the hydrogen is, for example, 0.1 to 10 MPa, preferably 0.1 to 8 MPa, and particularly preferably 0.1 to 6 MPa. There is also no particular limitation on the internal pressure of the carbon dioxide ($CO_2$), but the internal pressure of the carbon dioxide is, for example, 0.1 to 10 MPa, preferably 0.1 to 8 MPa, and particularly preferably 0.1 to 6 MPa. Methods for using the catalysts for the production of formic acid represented by the formulae (23) and (24) are stated in the reference literatures (a) to (c) in detail, and the methods can be performed easily by any person skilled in the art based on the description of this specification and common technical knowledge.

The catalytic hydrogenation of $CO_2$ in an acidic solution that is disclosed in the reference literature (b) will be described as an example of the method for using the catalysts for the production of formic acid represented by the formulae (23) and (24). That is, first, a Parr Bench Top Micro Reactor (product name, cylinder volume 50 $cm^3$) is prepared as a reactor vessel (pressure vessel). This reactor vessel is made of an alloy called Hastelloy (registered trademark of Haynes International, Inc.). Next, a catalyst for the production of formic acid represented by the formula (23) or (24) (20.0 µmol) is dissolved in a citrate buffer solution (20 $cm^3$) at pH 3.0, and the solution is enclosed in the pressure vessel. Then, the solution is heated to 40° C., pressurized by blowing $CO_2$ and $H_2$ thereinto as appropriate, and reacted for an appropriate amount of time. After the internal pressure of the vessel is reduced to normal pressure, the solution is quickly cooled on an ice bath. Formation of formic acid HCOOH can be confirmed by, for example, performing $^1$H-NMR measurements of the product solution in $D_2O$ using TSP (deuterated sodium 3-(trimethylsilyl)propionate, $(CH_3)_3Si(CD_2)_2CO_2Na$) as an internal standard.

The catalyst according to the present invention can be used as a catalyst for the decomposition of formic acid in, for example, formic acid fuel cells and the like. In the case where the catalyst is used in a fuel cell, for example, it is sufficient that the cell contains the catalyst for the decomposition of formic acid according to the present invention and includes therein a mechanism for generating hydrogen by decomposing formic acid according to the above-described method. There is no particular limitation on the specific structure, and, for example, the structure or the like of a known fuel cell can be applied as appropriate. Furthermore, the application of the catalyst for the decomposition of formic acid according to the present invention is not limited to the applications mentioned above, and, for example, the catalyst for the decomposition of formic acid according to the present invention can be used in every technical field in which a supply of hydrogen ($H_2$) is needed.

EXAMPLES

Hereinafter, examples of the present invention will be described. However, it should be understood that the present invention is not limited to the following examples only.

Measurement Conditions and the Like

In the examples below, reactions were followed by the measurement of ultraviolet-visible absorption spectra, ESI-Mass, GC, and $^1$H-NMR. All chemical substances were of reagent grade. The dihydrate of cis-bis(2,2'-bipyridine)dichlororuthenium $Ru(bpy)_2Cl_2$ was purchased from Strem Chemicals, Inc. 2,2'-Bipyrimidine was purchased from Aldrich. Formic acid was purchased from Wako Pure Chemical Industries, Ltd. The measurement of ultraviolet-visible absorption spectra (UV-Vis. spectra) was performed using equipment (UV-3100PC) from Shimadzu Corporation. The measurement of fluorescence spectra was performed using equipment (RF-5300PC) from Shimadzu Corporation. ESI-MS data was collected using an API-150EX mass spectrometer (manufactured by PE-Sciex) in the positive detection mode, the mass spectrometer being equipped with an ion spray interface. A spray device was held at a voltage of +5.0 kV, and pressurized $N_2$ was used to assist in the spraying of liquid. $^1$H-NMR measurement was performed using equipment from JEOL, that is, a nuclear magnetic resonance spectrometer (JNM-AL 300, 300.4 MHz during $^1$H-NMR measurement). $^{13}$C-NMR measurement was performed using equipment from Varian, that is, a nuclear magnetic resonance spectrometer (UNITY INOVA 600, 599.9 MHz during $^{13}$C-NMR measurement). GC analysis was performed using equipment (GC-14B) from Shimadzu Corporation. Transient absorption spectra were observed by laser flash photolysis. Femto- and nano-second laser flash photolysis measurements were performed using a femto- and nano-second time-resolved spectrophotometer (manufactured by Unisoku). Elemental analysis was performed using a CHN-Corder (MT-2 type) from Yanagimoto Mfg. Co., Ltd.

Complex Production Example 1

Production of a Dinuclear Metal Complex (Aqua Complex)

An iridium-ruthenium dinuclear aqua complex (8), which is the compound (dinuclear metal complex) according to the present invention, was produced (synthesized) in the following manner. That is, first, a dehydrate (3.1 g, 6 mmol, manufactured by Strem Chemicals, Inc.) of bis(2,2'-bipyridine)dichlororuthenium $Ru(bpy)_2Cl_2$, which is a commercially available reagent, was added to water (20 ml) to form an aqueous solution. $Ag_2SO_4$ (1.87 g, 6 mmol) was added to the solution, and the solution was then stirred at room temperature for 12 hours. The precipitate AgCl was filtered off with a glass filter (G4), and the filtrate further was filtered through a membrane filter (Advantec, made of PTFE (polytetrafluoroethylene)). The filtrate was dehydrated under reduced pressure to obtain a sulfate ($SO_4^{2-}$) salt of $[Ru(bpy)_2(H_2O)_2]^{2+}$ as an air-stable red solid. The sulfate (0.6 g, 1.1 mmol) of the ruthenium aqua complex $[Ru(bpy)_2(H_2O)_2]^{2+}$ was dissolved in 40 mL of water to form an aqueous solution. When one equivalent of 2,2'-bipyrimidine (manufactured by Johnson Matthey) was added to this solution, the 2,2'-bipyrimidine immediately reacted with $[Ru(bpy)_2(H_2O)_2]^{2+}$ to yield an aqueous solution of a ruthenium complex $[Ru(bpy)_2bpm]^{2+}$ (bpm=2,2'-bipyrimidine) having a bridging ligand. Furthermore, water was distilled off (removed by evaporation) from this aqueous solution to isolate a sulfate of $[Ru(bpy)_2bpm]^{2+}$ (bpm=2,2'-bipyrimidine). Here are the data obtained by instrumental analysis of the $[Ru(bpy)_2(H_2O)_2]^{2+}$ sulfate and the $[Ru(bpy)_2bpm]^{2+}$ sulfate.

Sulfate of ruthenium aqua complex $[Ru(bpy)_2(H_2O)_2]SO_4$:

$^1$H-NMR ($D_2O$, 298 K) δ (TSP, ppm) 7.06 (t, J=7 Hz, 2H, bpy), 7.70 (d, J=6 Hz, 2H, bpy), 7.74 (t, J=8 Hz, 2H, bpy), 7.88 (t, J=7 Hz, 2H, bpy), 8.23 (t, J=8 Hz, 2H, bpy), 8.34 (d, J=8 Hz, 2H, bpy), 8.56 (d, J=8 Hz, 2H, bpy), 9.36 (d, J=5 Hz, 2H, bpy). $^{13}$C-NMR ($D_2O$, 298 K) δ (TSP, ppm) 126.09, 126.26, 128.43, 129.73, 138.62, 140.28, 154.43, 157.23, 161.13, 163.37.

UV-Vis. (nm): 243, 290, 339, 481, 647 (sh).

Elemental analysis: $[Ru(bpy)_2(H_2O)_2]SO_4 \cdot H_2O$: $C_{20}H_{22}N_4O_7SRu$; theoretical value: C, 42.63; H, 3.93; N, 9.94. Observed value: C, 42.53; H, 3.67; N, 9.95.

Mass spectrometry (ESI-MS): m/z $[M-2H_2O-SO_4+PF_6]^+$ 559.0, theoretical value $C_{20}H_{16}N_4F_6PRu$ 559.0.

Sulfate of Ruthenium Complex [Ru(bpy)$_2$bpm]SO$_4$:

$^1$H-NMR (D$_2$O, 298 K) δ (TSP, ppm) 7.41 (t, J=7 Hz, 2H, bpy), 7.45 (t, J=7 Hz, 2H, bpy), 7.60 (t, J=5 Hz, 2H, bpm), 7.80 (d, J=5 Hz, 2H, bpy), 7.94 (d, J=5 Hz, 2H, bpy), 8.09 (t, J=8 Hz, 2H, bpy), 8.12 (t, J=8 Hz, 2H, bpy), 8.24 (dd, J=6, 2 Hz, 2H, bpm), 8.57 (d, J=8 Hz, 2H, bpy), 8.58 (d, J=7 Hz, 2H, bpy), 9.09 (dd, J=5, 2 Hz, 2H, bpm). $^{13}$C-NMR (D$_2$O, 298 K) δ (TSP, ppm) 124.40 (bpy), 124.44 (bpy), 124.51 (bpm), 127.48 (bpy), 127.65 (bpy), 138.39 (bpy), 138.53 (bpy), 151.72 (bpy), 151.89 (bpy), 157.04 (bpy), 157.09 (bpy), 157.70 (bpm), 159.98 (bpm), 163.11 (bpm).

UV-Vis. (nm): 244, 283, 415.

Elemental analysis: [Ru(bpy)$_2$bpm]SO$_4$.4H$_2$O: C$_{28}$H$_{30}$N$_8$O$_8$SRu; theoretical value: C, 45.46; H, 4.09; N, 15.15. Observed value: C, 45.39; H, 4.06; N, 15.36.

Mass spectrometry (ESI-MS): m/z [M-SO$_4$+PF$_6$]$^+$ 717.0, theoretical value C$_{28}$H$_{22}$N$_8$F$_6$PRu 717.1.

Meanwhile, a sulfate (SO$_4^{2-}$) salt of an organometallic iridium aqua complex [Cp*Ir(H$_2$O)$_3$]$^{2+}$ was synthesized and isolated according to the methods disclosed in Ogo, S.; Makihara, N.; Watanabe, Y., Organometallics, 1999, 18, 5470-5474 and Ogo, S.; Nakai, H.; Watanabe, Y., J. Am. Chem. Soc., 2002, 124, 597-601. Note that Cp* represents a pentamethylcyclopentadienyl group. Specific operations for the synthesis and isolation were as follows. That is, first, Ag$_2$SO$_4$ (1.87 g, 6 mmol) was added to an aqueous suspension solution (20 mL) of a commercially available reagent, dichloro(pentamethylcyclopentadienyl)iridium(III) dimer [Cp*IrCl$_2$]$_2$ (2.4 g, 3 mmol, Strem Chemicals, Inc.), and the solution was stirred at room temperature for 12 hours. Then, the precipitate AgCl was filtered off with a glass filter, and the filtrate was further filtered through a membrane filter (Advantec, made of PTFE). The filtrate was dehydrated under reduced pressure to obtain [Cp*Ir(H$_2$O)$_3$]$^{2+}$SO$_4$ as an air-stable yellow solid. Note that the values obtained by instrumental analysis of the product were compared with the values disclosed in the aforementioned reference literatures Ogo, S.; Makihara, N.; Watanabe, Y., Organometallics, 1999, 18, 5470-5474 and Ogo, S.; Nakai, H.; Watanabe, Y., J. Am. Chem. Soc., 2002, 124, 597-601 to determine the presence of the organometallic iridium aqua complex [Cp*Ir(H$_2$O)$_3$]$^{2+}$. That is, the values obtained by the instrumental analysis of the product [Cp*Ir(H$_2$O)$_3$]$^{2+}$SO$_4$ were as follows and were in good agreement with the values disclosed in the aforementioned reference literatures.

[Cp*Ir(H$_2$O)$_3$]$^{2+}$SO$_4$:

$^1$H NMR (D$_2$O, pH 2.3, 25° C.) δ (DSS, ppm): 1.61 (s; Cp*).

$^1$H NMR (DMSO-d$_6$, 25° C.) δ (the residual hydrogen of DMSO-d$_6$ at 2.50 ppm was used as a reference): 1.68 (s; Cp*), 3.31 (br; H$_2$O).

$^{13}$C NMR (D$_2$O, pH 2.3, 25° C.) δ (DSS, ppm) 11.09 (S; η$^5$-C$_5$(CH$_3$)$_5$), 86.94 (s; η$^5$-C$_5$(CH$_3$)$_5$).

Elemental analysis: [Cp*Ir(H$_2$O)$_3$]$^{2+}$SO$_4$: C$_{10}$H$_{21}$Ir$_1$O$_7$S$_1$; theoretical value: C, 25.15; H, 4.43. Observed value: C, 25.39; H, 4.48.

Furthermore, the [Ru(bpy)$_2$bpm]$^{2+}$ sulfate synthesized and isolated in the above-described manner was reacted with one equivalent of the organometallic iridium aqua complex [Cp*Ir(H$_2$O)$_3$]$^{2+}$ in water at room temperature to obtain the objective iridium-ruthenium dinuclear aqua complex (8) (Scheme 1 below). Note that in Scheme 1 below, a formula (101) represents [Ru(bpy)$_2$bpm]$^{2+}$ and a formula (102) represents [Cp*Ir(H$_2$O)$_3$]$^{2+}$.

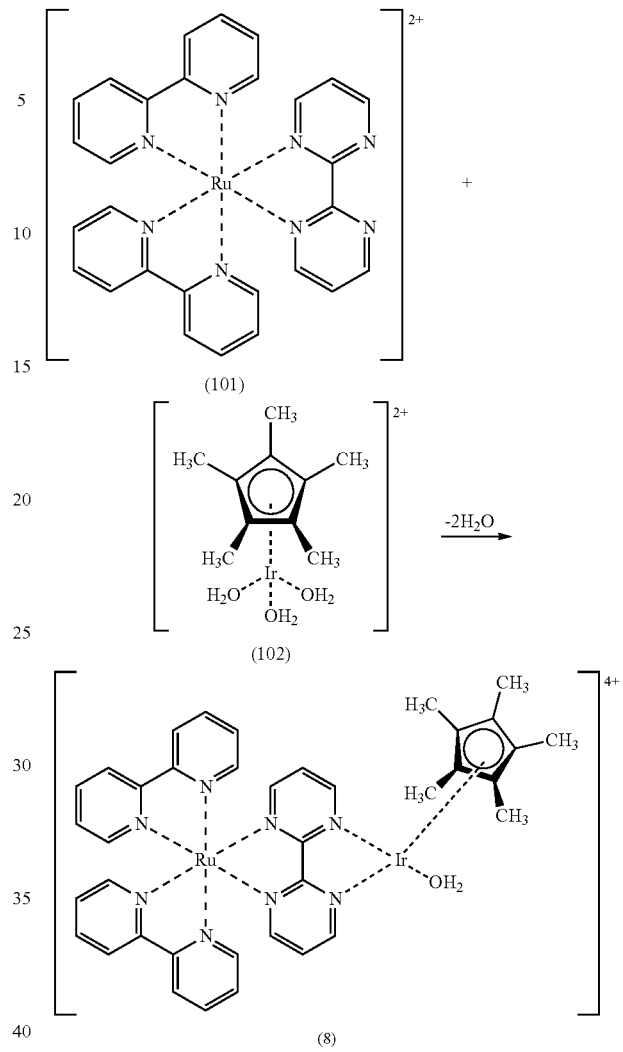

Figure 4:
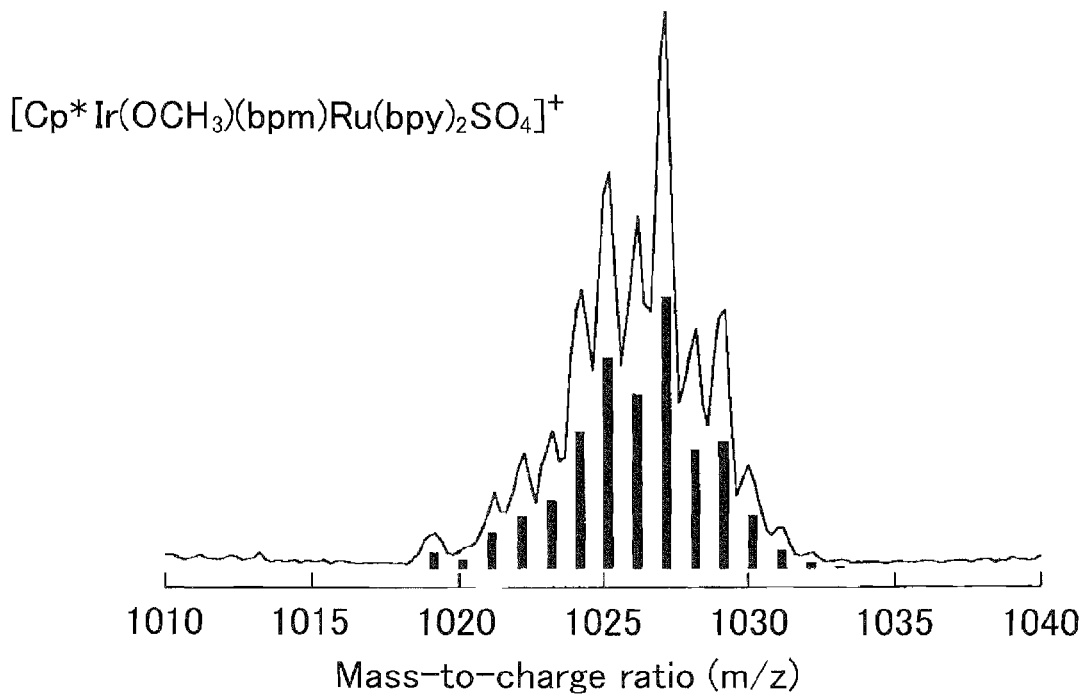
FIG. 4 is a diagram showing a portion of an ESI-MS spectrum of a compound of the example.

Specifically, operations of Scheme 1 above were performed in the following manner. That is, first, the aforementioned sulfate (162.7 mg, 0.22 mmol) of [Ru(bpy)$_2$bpm]$^{2+}$ was dissolved in 10 mL of water to form an aqueous solution. Meanwhile, the sulfate (105.1 mg, 0.22 mmol) of the organometallic iridium aqua complex [Cp*Ir(H$_2$O)$_3$]$^{2+}$ was dissolved in 10 mL of water to form an aqueous solution. Immediately after these two aqueous solutions were mixed, a reaction occurred to yield an aqueous solution of the iridium-ruthenium dinuclear aqua complex (8). Then, water was distilled off from this aqueous solution to isolate a sulfate of the iridium-ruthenium dinuclear aqua complex (8), and the structure thereof was determined by $^1$H-NMR, UV-Vis., and ESI-MS. Heavy water (D$_2$O) was used as the solvent for the $^1$H-NMR measurement, and TSP-d$_4$ (sodium trimethylsilylpropionate) was used as the standard substance. Water was used as the solvent for the UV-Vis. measurement. Methanol was used as the solvent for the ESI-MS measurement. FIG. 4 shows a portion of an ESI-MS spectrum of the aqua complex (8). As shown in FIG. 4, in this ESI-MS spectrum, a methoxide complex (11) [Ru(bpy)$_2$bpmIrCp*(OCH$_3$)SO$_4$]$^+$ in which a water molecule (aqua ligand), which is a ligand of the aqua complex (8), was replaced by a methoxide ion was observed as the parent ion peak at the highest m/z (m/z=1027). Since the sulfate of the water-soluble iridium-ruthenium dinuclear aqua complex (8) has hygroscopicity, a few drops of a saturated aqueous solution of potassium hexafluorophosphate (manufactured by Tokyo Chemical Industry Co., Ltd.) were dropped to the aqueous solution of the sulfate of the iridium-ruthenium dinuclear aqua complex (8), and a dark-green solid that was precipitated as a slightly water-soluble hexafluorophosphate of the iridium-ruthenium dinuclear aqua complex (8) as a result of counterion exchange was filtered by suction and thereafter vacuum dried. The product was then subjected to elemental analysis. The measurement results of the aforementioned $^1$H-NMR, UV-Vis., mass spectrometry, and elemental analysis are shown below.

Iridium-ruthenium dinuclear aqua complex (8): $[Ru(bpy)_2bpmIrCp*(OH_2)](SO_4)_2$:

$^1$H-NMR (D$_2$O, 298 K) δ (TSP, ppm) 1.71 (s, 15H, Cp*), 7.42 (t, J=7 Hz, 2H, bpm), 7.50 (t, J=7 Hz, 1H, bpy), 7.55 (t, J=7 Hz, 1H, bpy), 7.70 (d, J=5 Hz, 1H, bpy), 7.75 (d, J=7 Hz, 1H, bpy), 7.95 (t, J=6 Hz, 1H, bpy), 7.97 (t, J=6 Hz, 1H, bpy), 8.09-8.14 (m, 5H, bpm, bpy), 8.18 (t, J=8 Hz, 1H, bpy), 8.47 (d, J=5 Hz, 1H, bpy), 8.53 (d, J=6 Hz, 1H, bpy), 8.54-8.62 (m, 4H, bpm, bpy), 9.45 (td, J=5, 2 Hz, 2H, bpm).

$^{13}$C-NMR (D$_2$O, 298 K) δ (TSP, ppm) 10.97 (CH$_3$), 93.54 ($\eta^5$-C$_5$(CH$_3$)$_5$), 127.26, 127.31, 127.39, 127.58, 130.00, 130.25, 130.32, 130.52, 130.79, 131.03, 154.49, 154.61, 155.15, 156.31, 159.03, 159.75, 159.76, 159.88, 160.20, 160.49, 164.56, 164.77, 169.08, 169.23.

UV-Vis. (nm): 246, 279, 412, 575.

Elemental analysis: $[Ru(bpy)_2bpmIrCp*(OH_2)](PF_6)_4$: C$_{38}$H$_{39}$N$_8$OF$_{24}$P$_4$RuIr; theoretical value: C, 30.49; H, 2.63; N, 7.49. Observed value: C, 30.28; H, 2.58; N, 7.52.

Mass spectrometry (ESI-MS): m/z $[M-SO_4+CH_3O]^+$ 1027.0, theoretical value C$_{28}$H$_{22}$N$_8$F$_6$PRu 1027.2.

Figure 5:
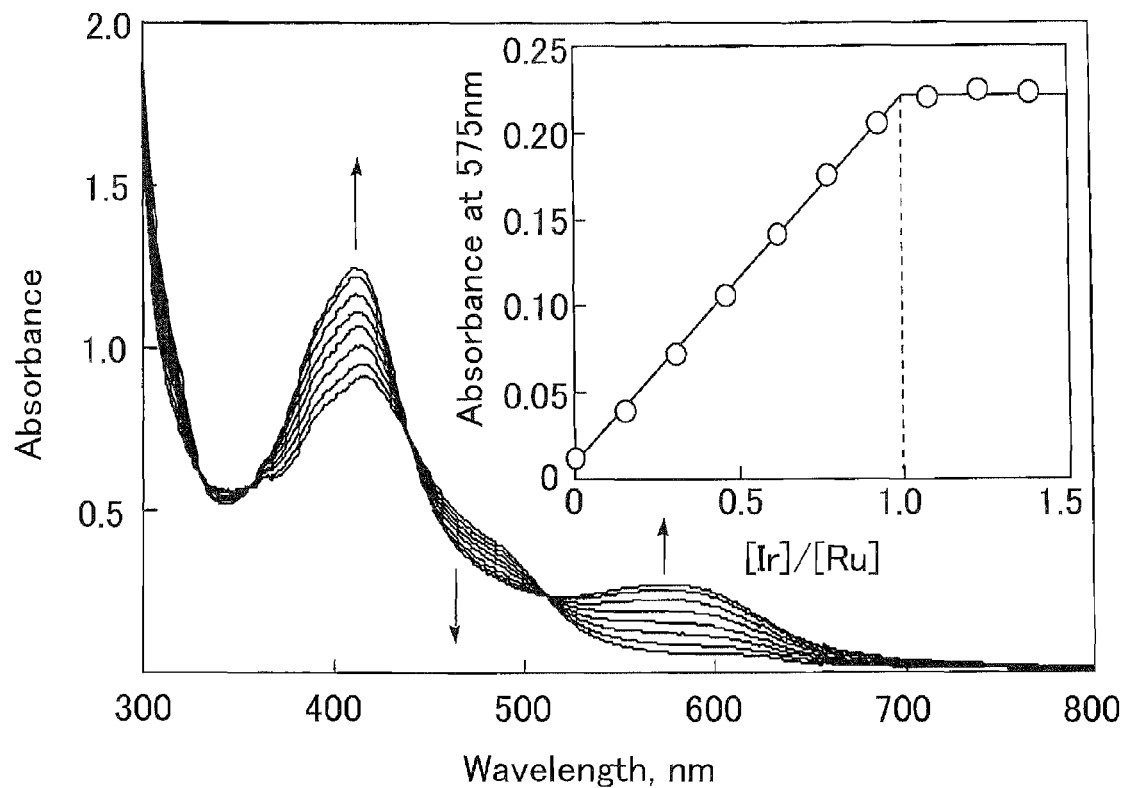
FIG. 5 is a graph showing changes in the UV-Vis. spectrum when $[Cp^*Ir(H_2O)_3]^{2+}$ was added to an aqueous solution of $[Ru(bpy)_2bpm]^{2+}$ ($1.2 \times 10^{-3}$ mol/L).

Incidentally, $[Cp*Ir(H_2O)_3]^{2+}$ was added to an aqueous solution of $[Ru(bpy)_2bpm]^{2+}$ (1.2×10$^{-3}$ mol/L), and UV-Vis. spectra were measured while the concentration of $[Cp*Ir(H_2O)_3]^{2+}$ was varied from 0 to 1.7×10$^{-3}$ mol/L. The optical path length was 1 mm. The graph in FIG. 5 shows the obtained UV-Vis. spectra. In FIG. 5, the vertical axis represents the absorbance and the horizontal axis represents the wavelength. The curves in FIG. 5 indicate the UV-Vis. spectra at the various $[Cp*Ir(H_2O)_3]^{2+}$ concentrations, and the arrows indicate how the absorbance in each absorption band increased or decreased with the increase in $[Cp*Ir(H_2O)_3]^{2+}$ concentration. As shown in FIG. 5, the absorbance in the absorption bands where the absorption maximum wavelengths were 412 nm and 575 nm increased with the increase in $[Cp*Ir(H_2O)_3]^{2+}$ concentration, and the absorbance in the absorption band where the maximum absorption wavelength was 470 nm conversely decreased with the increase in $[Cp*Ir(H_2O)_3]^{2+}$ concentration. However, in all of these absorption bands, no change was observed after the concentration of $[Cp*Ir(H_2O)_3]^{2+}$ exceeded 1.2×10$^{-3}$ M, i.e., one equivalent with respect to $[Ru(bpy)_2bpm]^{2+}$. Furthermore, the graph in the inset diagram of FIG. 5 shows the absorbance at a wavelength of 575 nm in FIG. 5 and the concentration ratio, i.e., the amount-of-substance ratio, ([Ir]/[Ru]) of $[Cp*Ir(H_2O)_3]^{2+}/[Ru(bpy)_2bpm]^{2+}$. In this graph, the vertical axis represents the absorbance at the wavelength of 575 nm and the horizontal axis represents [Ir]/[Ru]. As shown in this graph, the absorbance at the wavelength of 575 nm increased in proportion to the concentration of $[Cp*Ir(H_2O)_3]^{2+}$ until the concentration of $[Cp*Ir(H_2O)_3]^{2+}$ reached 1.2×10$^{-3}$ mol/L, i.e., one equivalent with respect to $[Ru(bpy)_2bpm]^{2+}$, but was unchanged at $[Cp*Ir(H_2O)_3]^{2+}$ concentrations higher than 1.2×10$^{-3}$ mol/L. This also demonstrated that $[Ru(bpy)_2bpm]^{2+}$ and $[Cp*Ir(H_2O)_3]^{2+}$ reacted in the aqueous solution in an amount-of-substance ratio of 1:1 to form the dinuclear complex.

Figure 6:
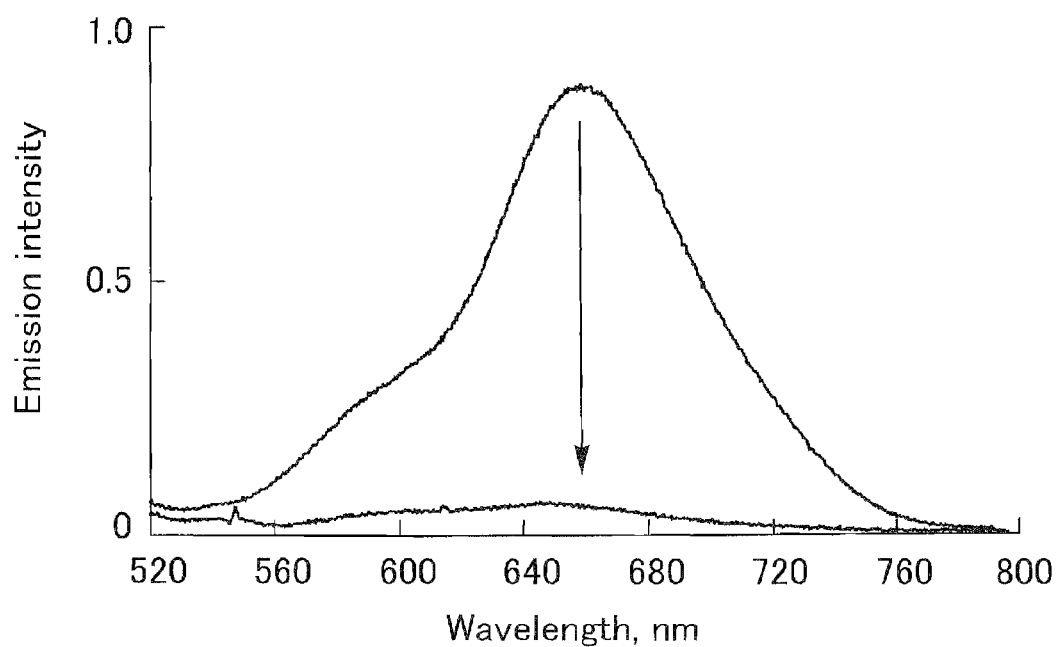
FIG. 6 is a graph showing changes in the emission spectrum when one equivalent of $[Cp^*Ir(H_2O)_3]^{2+}$ was added to an aqueous solution of $[Ru(bpy)_2bpm]^{2+}$ ($2.0 \times 10^{-4}$ mol/L).

Furthermore, one equivalent of $[Cp*Ir(H_2O)_3]^{2+}$ was added to an aqueous solution (2.0×10$^{-4}$ mol/L) of $[Ru(bpy)_2bpm]^{2+}$, and the emission spectrum of $[Ru(bpy)_2bpm]^{2+}$ was measured. The measurement was performed using a 1×1 cm square quartz cuvette with four transparent sides. The graph in FIG. 6 shows the changes in the emission spectrum. In this graph, the vertical axis represents the emission intensity and the horizontal axis represents the wavelength. The upper curve in this graph shows the emission spectrum of $[Ru(bpy)_2bpm]^{2+}$, and the lower curve shows the emission spectrum after the addition of one equivalent of $[Cp*Ir(H_2O)_3]^{2+}$. The arrow indicates an almost complete decrease in the emission intensity due to the addition of $[Cp*Ir(H_2O)_3]^{2+}$. This also demonstrated that $[Ru(bpy)_2bpm]^{2+}$ and $[Cp*Ir(H_2O)_3]^{2+}$ reacted in the aqueous solution in an amount-of-substance ratio of 1:1 to form the dinuclear complex.

Complex Production Example 2

Production of a Dinuclear Metal Complex (Hydride Complex)

The aqua complex (8) synthesized in Example 1 was reacted with an excess amount of formic acid in water (pH 2.0). Specifically, dilute sulfuric acid was added to 0.4 mL of water to adjust the pH to 2.0, and a sulfate (1.0 mg, 8.8×10$^{-3}$ mmol) of the aqua complex (8) synthesized in the above-described manner was added and dissolved therein. After the aqueous solution was deoxygenated by bubbling argon gas, formic acid (8.3 mL, 2.2×10$^{-1}$ mol) was added to the aqueous solution and reacted at 333 K. When the UV-Vis. spectrum of the aqueous solution after the reaction was measured, the spectrum of an iridium hydride complex (9) in which the aqua ligand of the aqua complex (8) was replaced by hydride was observed. Note that the structure of the iridium hydride complex (9) was as represented by the formula (9). Here are the data obtained by instrumental analysis of the iridium hydride complex (9).

Iridium Hydride Complex (9):

$^1$H-NMR(H$_2$O, 298 K) δ (TSP/D$_2$O, ppm) −11.4 (s, Ir—H), 1.91 (s, 15H, Cp*), 7.41-7.55 (m, 4H, bpm, bpy), 7.65-7.75 (m, 2H, bpm, bpy), 7.86 (d, J=5 Hz, 1H, bpy), 7.98 (d, J=7 Hz, 1H, bpy), 8.05-8.20 (m, 5H, bpm, bpy), 8.32 (m, 1H, bpm, bpy), 8.45-8.65 (m, 6H, bpm, bpy), 9.27 (d, J=5 Hz, 2H, bpm).

UV-Vis. (nm): 391 (sh), 409, 518, 590.

Complex Production Example 3

Production of a Dinuclear Metal Complex (Iridium Monovalent Complex)

The aqua complex (8) was reacted with formic acid in the same manner as in Complex Production Example 2 except that the pH of the aqueous solution was set to 4.0 instead of 2.0 by adding sodium hydroxide to the aqueous solution. When the UV-Vis. absorption spectrum of the aqueous solution after the reaction was measured, a spectrum extending into the near infrared region (λ>900 nm) and having several absorption maximums ($\lambda_{max}$=453, 512, and 723 nm) was observed. This spectrum can be considered to be derived from an iridium monovalent complex represented by the formula (10). A possible reaction mechanism is, for example, that the aqua complex (8) reacted with one equivalent of formic acid to generate the iridium hydride complex (9), which was then thermally deprotonated to generate the iridium monovalent complex (10). However, this is an example of an inferable mechanism and is not to be construed as limiting the present invention. Here are the data obtained by instrumental analysis.

Iridium Monovalent Complex (10):
UV-Vis. (nm): 409, 453 (sh), 512, 723, 795 (sh).

Complex Production Example 4

Figure 7:
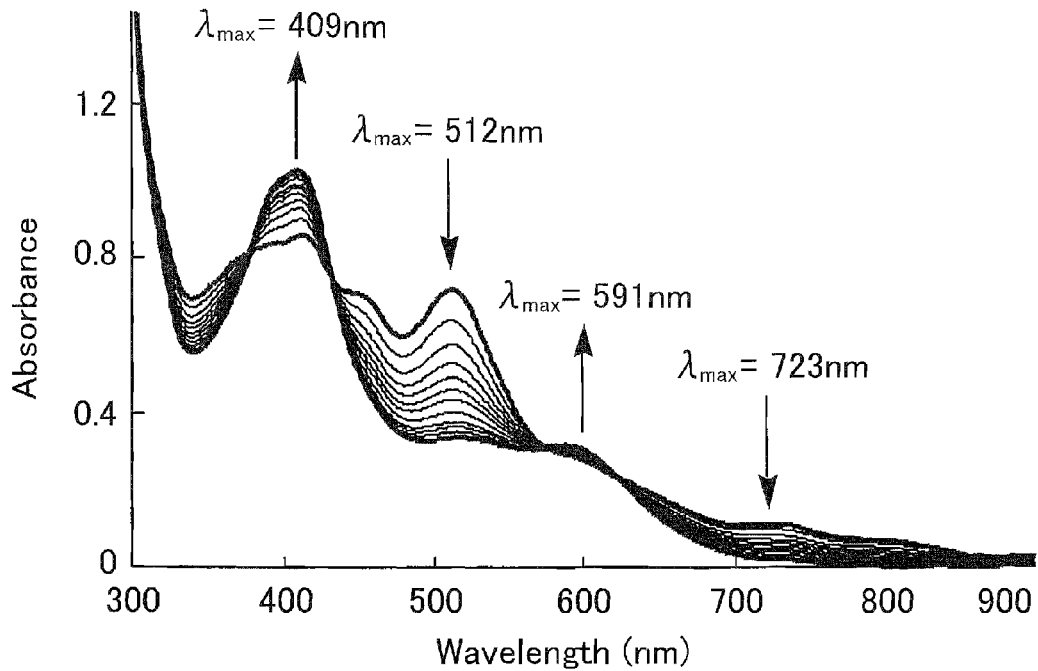
FIG. 7 is a graph showing changes in the UV-Vis. absorption spectrum when diluted sulfuric acid was added to an aqueous solution of an iridium monovalent complex of an example.
Figure 8A:
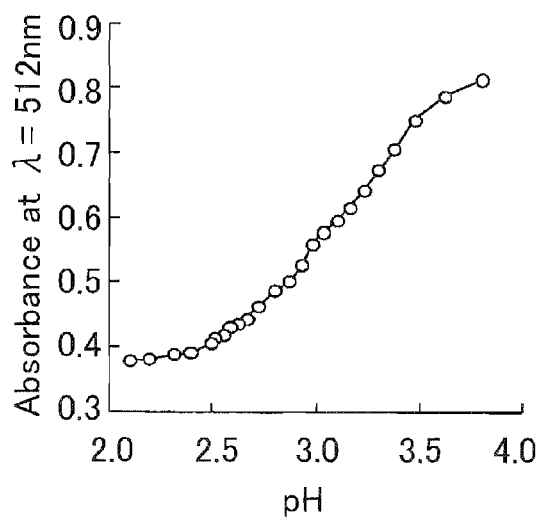
FIG. 8(A) is a graph showing the relationship between the absorbance at a wavelength of 512 nm in FIG. 7 and pH.
Figure 8B:
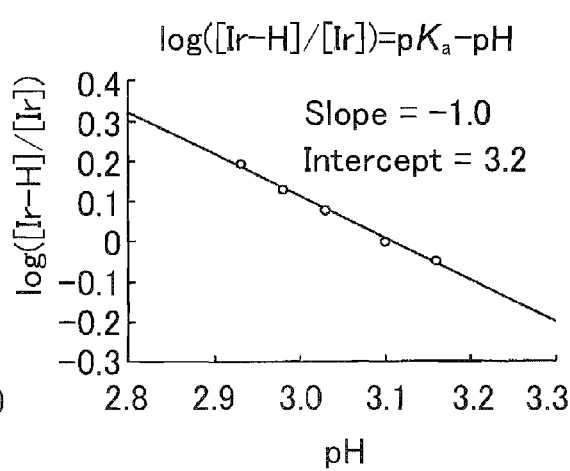
FIG. 8(B) is a graph showing the relationship between log([Ir—H]/[Ir]) in the measurement of FIG. 7 and pH.

Generation of an Iridium Monovalent Complex by Deprotonation of an Iridium Hydride Complex In Complex Production Example 2, a deoxidized $1.5 \times 10^{-4}$ mol/L dilute sulfuric acid was added to the aqueous solution of the iridium hydride complex (9) after the completion of the reaction of the aqua complex (8) with formic acid at pH 2.0 to change the pH to 2.1 to 3.9, and the UV-Vis. absorption spectrum at each pH was measured. The graph in FIG. 7 shows the observed spectra. In FIG. 7, the horizontal axis represents the wavelength (nm), and the vertical axis represents the absorbance. Moreover, the arrows indicate the changes in the absorbance due to a decrease in pH (an increase in acidity). As shown in FIG. 7, with the decrease in pH (the increase in acidity), the absorbance at maximum absorption wavelengths of 409 nm and 591 nm increased, and conversely, the absorbance at 512 nm and 723 nm decreased. Furthermore, the graph in FIG. 8(A) shows the relationship between the absorbance at the wavelength of 512 nm in FIG. 7 and pH. In this graph, the horizontal axis represents the pH, and the vertical axis represents the absorbance. As shown in this graph, the absorbance at the wavelength of 512 nm gently decreased from about 0.8 to about 0.4 as the pH decreased from about 4 to about 2. Furthermore, the graph in FIG. 8(B) shows the relationship between the logarithm value log([Ir—H]/[Ir]) of a value calculated by dividing the iridium hydride complex (9) concentration by the iridium monovalent complex (10) concentration and pH. In this graph, the horizontal axis represents the pH, and the vertical axis represents the log([Ir—H]/[Ir]). As shown in this graph, a straight line with a slope of −1.0 and an intercept of 3.2 was obtained. Since log([Ir—H]/[Ir]) is equal to $pK_a$-pH, it was determined that the iridium hydride complex (9) had a $pK_a$ of 3.2.

Figure 9:
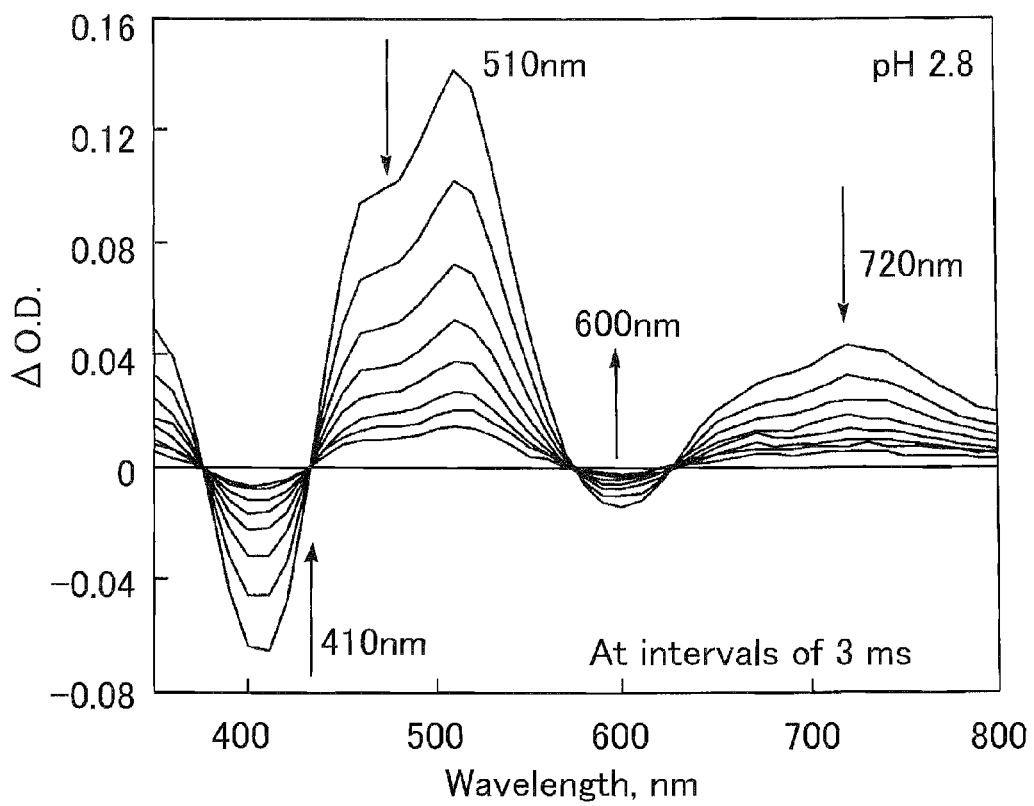
FIG. 9 is a graph showing transient absorption spectra obtained by nanosecond laser flash photolysis of a hydride complex of an example.

Moreover, nanosecond laser flash photolysis of an aqueous solution of the iridium hydride complex (9) was performed by irradiating the solution with a visible laser pulse. The aqueous solution used was an aqueous solution (acidified by sulfuric acid, iridium hydride complex (9) concentration=$1.8 \times 10^{-4}$ M, pH 2.8) of the iridium hydride complex (9) after the aqua complex (8) was reacted with formic acid at pH 2.0 as described above. The irradiated light output was 7 mJ/pulse. Moreover, the wavelength (420 nm) corresponding to the characteristic absorption band ($\lambda_{max}$=409 nm) of the iridium hydride complex (9) was used as the excitation wavelength. Note that this absorption band is considered to be the MLCT absorption band derived from the ruthenium (II) complex moiety of the iridium hydride complex (9). FIG. 9 shows the transient absorption spectra obtained by the nanosecond laser flash photolysis. In FIG. 9, the horizontal axis represents the wavelength (nm), and the vertical axis represents the difference in optical density (ΔO.D.). The arrows indicate the changes in the difference in optical density after irradiation. After irradiating the aqueous solution with the excitation laser pulse, transient absorption spectra were observed at intervals of 3 milliseconds. As shown in FIG. 9, absorption appeared at wavelengths of 510 nm and 720 nm immediately after the irradiation, and the differences in optical density at these wavelengths decreased thereafter, whereas bleaching (fading) occurred at 410 nm and 600 nm, and the differences in optical density at these wavelengths increased thereafter. As a result, the absorption maximum wavelengths immediately after the irradiation matched the $\lambda_{max}$ of the iridium monovalent complex (10). This observation indicates that when the iridium hydride complex (9) was excited by irradiating the solution with a visible laser pulse, the Ir—H bond was cleaved, resulting in deprotonation; thus, the iridium hydride complex (9) served as an acid generator.

Furthermore, even when the aqueous solution was excited by laser irradiation at 600 nm instead of 409 nm, transient absorption spectra derived from the iridium monovalent complex (10) were obtained. That is to say, it was confirmed that photodeprotonation from a metal-hydride bond of the iridium hydride complex (9) can be achieved by light at a longer wavelength than that for a conventional hydride complex. Note that a conventional organometallic iridium hydride complex [Cp*Ir(bpy)H]$^+$ (Cp*=pentamethylcyclopentadienyl, bpy=2,2'-bipyridine) could not be photodeprotonated at a wavelength of 500 nm or longer. This organometallic iridium hydride complex [Cp*Ir(bpy)H]$^+$ is disclosed in JP 2005-104880A, Suenobu, T.; Guldi, D. M.; Ogo, S.; Fukuzumi, S., Angew. Chem., Int. Ed., 2003, 42, 5492-5495, and Abura, T.; Ogo, S.; Watanabe, Y; Fukuzumi, S., J. Am. Chem. Soc., 2003, 125, 4149-4154.

Figure 10:
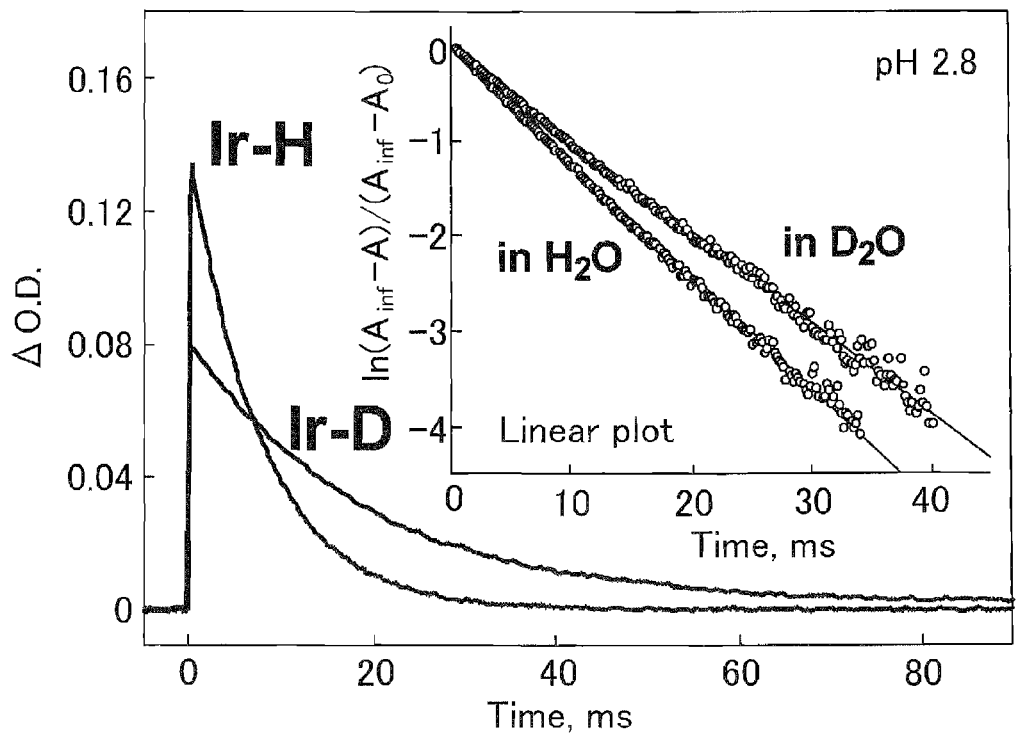
FIG. 10 is a graph showing a deuterium isotope effect of the hydride complex of the example in nanosecond laser flash photolysis.

Furthermore, nanosecond laser flash photolysis was performed in the same manner, but using heavy water instead of water, and the rate constants (the rate constant in water $k_H$ and the rate constant in heavy water $k_D$) of the protonation reactions of the iridium(I) metal center for the iridium monovalent complexes (10) in water and in heavy water were compared with each other. The vertical axis of the graph in FIG. 10 represents the difference in optical density at a wavelength of 512 nm, and the horizontal axis represents the laser irradiation time. In FIG. 10, the curve denoted by "Ir—H" shows a spectrum for the laser irradiation in water, and the curve denoted by "Ir-D" shows a spectrum for the laser irradiation in heavy water. Furthermore, the inset diagram in FIG. 10 is a graph created by converting the vertical axis of FIG. 10 to $\ln[(A_{inf}-A)/(A_{inf}-A_0)]$. "A" represents the difference in optical density at a specific irradiation time, $A_{inf}$ represents the difference in optical density at the time when an infinite amount of time has elapsed after the laser pulse irradiation, and $A_0$ represents the difference in optical density immediately after the irradiation. As shown in FIG. 10, the plots of $\ln[(A_{inf}-A)/(A_{inf}-A_0)]$ vs the irradiation time showed a linear relationship for both cases, i.e., the laser irradiation in water and in heavy water. Therefore, the rate constant in water was calculated to be $k_H=1.1 \times 10^2$ s$^{-1}$, and furthermore, a kinetic deuterium isotope effect ($k_H/k_D$=1.4) was confirmed. The deuterium isotope effect indicates that the removal of a proton (or deuterium) occurred in the aforementioned nanosecond laser flash photolysis. The confirmed deuterium isotope effect also demonstrated that the product in Complex Production Example 2 was a hydride complex.

Figure 11:
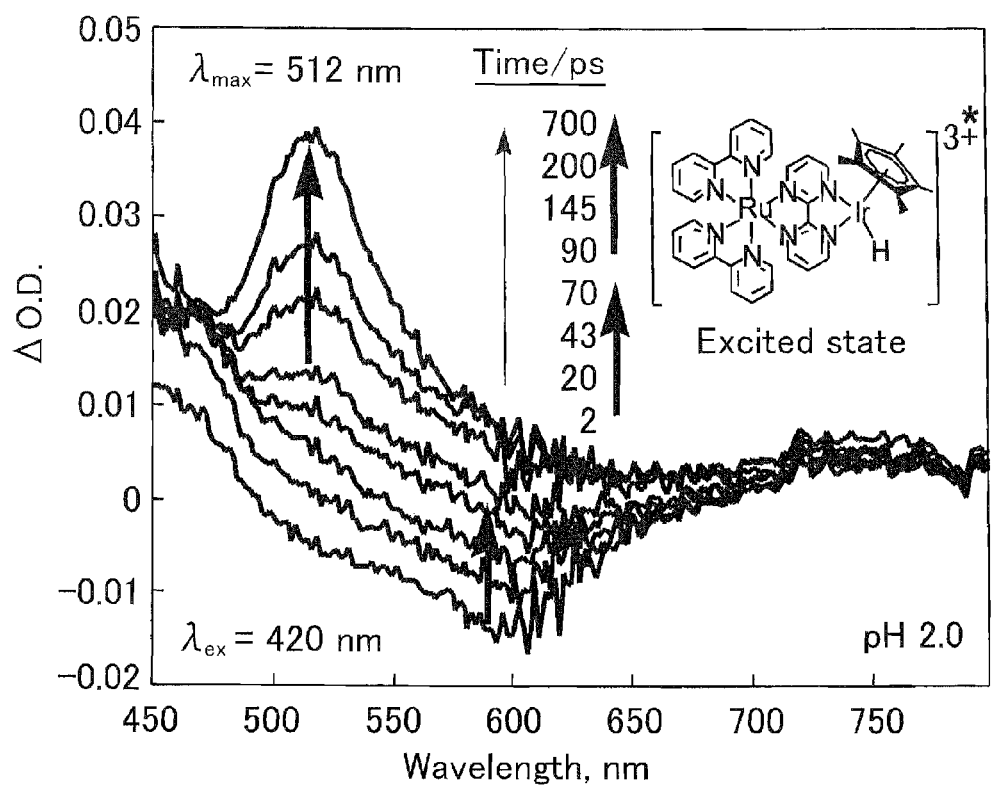
FIG. 11 is a graph showing transient absorption spectra obtained by femtosecond laser flash photolysis of the hydride complex of the example.

Moreover, femtosecond laser flash photolysis was performed under the same conditions. The excitation wavelength was 420 nm. The graph in FIG. 11 shows spectra obtained by femtosecond laser flash photolysis in water. In FIG. 11, the horizontal axis represents the wavelength (nm), and the vertical axis represents the difference in optical density. The arrows to the right and to the left of the numbers that represent the time after the laser pulse irradiation show increases in time. Furthermore, among the curves (spectra) that show absorbance, the arrow around a wavelength of 512 nm indicates that the absorbance around the maximum absorption wavelength of 512 nm continuously increased from the time 90 picoseconds to 700 picoseconds. Based on the absorbance around the maximum absorption wavelength 512 nm, the formation of the iridium monovalent complex (10) was confirmed. That is to say, the absorbance around 512 nm indicates that the Ir—H bond of the iridium hydride complex (9) was cleaved, resulting in deprotonation; thus, the iridium hydride complex (9) served as an acid generator. Note that a possible detailed mechanism is that a transition between excited states occurred from the time 0 to 70 picoseconds, and the formation of the iridium monovalent complex (10) due to the cleavage (deprotonation) of the Ir—H bond of the iridium hydride complex (9) occurred from the time 90 picoseconds to 700 picoseconds. However, this is an example of an inferable mechanism and is to be considered in all respects as not limiting the present invention.

Figure 12:
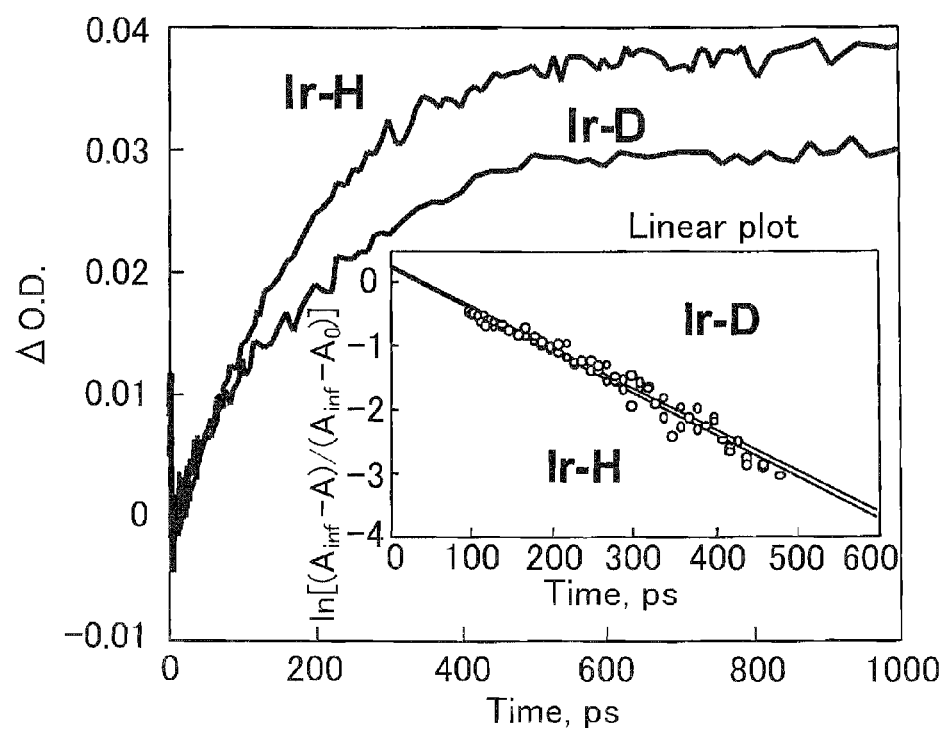
FIG. 12 is a graph showing a deuterium isotope effect of the hydride complex of the example in femtosecond laser flash photolysis.

Furthermore, femtosecond laser flash photolysis was performed in the same manner, but using heavy water instead of water, and the rate constants (the rate constant in water $k_H$ and the rate constant in heavy water $k_D$) of the deprotonation reactions from the iridium-hydride bond of the iridium hydride complexes (9) in water and in heavy water were compared with each other. The vertical axis of the graph in FIG. 12 represents the difference in optical density at a wavelength of 512 nm, and the horizontal axis represents the time after pulse laser irradiation. In FIG. 12, the curve denoted by "Ir—H" shows a spectrum for the laser irradiation in water, and the curve denoted by "Ir-D" shows a spectrum for the laser irradiation in heavy water. Note that in the measurements of FIG. 12, the initial concentration of the iridium hydride complex (9) was $9.0 \times 10^{-4}$ mol/L, and the optical path length was 2 mm. Furthermore, the inset diagram in FIG. 12 is a graph created by converting the vertical axis in FIG. 12 to $\ln[(A_{inf}-A)/(A_{inf}-A_0)]$. "A" represents the difference in optical density at a specific time after the irradiation, $A_{inf}$ represents the difference in optical density at an infinite time after the irradiation, and $A_0$ represents the difference in optical density immediately after the irradiation. As shown in FIG. 12, the relationship between $\ln[(A_{inf}-A)/(A_{inf}-A_0)]$ and the irradiation time was plotted as a linear, straight line for both cases, i.e., the laser irradiation in water and in heavy water. Therefore, $k_H$ and $k_H/k_D$ were calculated to be $k_H=6.6 \times 10^9 \text{ s}^{-1}$ and $k_H/k_D=1.0$, so that it was confirmed that a deuterium isotope effect was not shown in the femtosecond laser flash photolysis.

Example 1

Decomposition of Formic Acid and Production of Hydrogen by a Catalyst for the Decomposition of Formic Acid The iridium-ruthenium dinuclear aqua complex (8) produced in Complex Production Example 1 was dissolved in 400 µL of water to form a $2.2 \times 10^{-2}$ mol/L aqueous solution. After deoxygenation of this aqueous solution, 8.3 µL ($5.5 \times 10^{-1}$ mol/L, a molar amount 25 times the molar amount of the aqua complex (8)) of the formic acid was added to the aqueous solution, which was then heated for 5 seconds to 343 K; thus, an iridium-ruthenium dinuclear hydride complex (9) was formed. Thereafter, the reaction with formic acid continued at 298 K (25° C.) under dark conditions to generate a gas that clearly could be observed visually. The result of GC analysis of the gas indicated that the gas was a 1:1 mixed gas of hydrogen and carbon dioxide. That is to say, hydrogen and carbon dioxide could be produced by the decomposition of formic acid by a catalytic amount (4 mol %) of the aqua complex with respect to the formic acid.

Furthermore, decomposition of formic acid by the aqua complex (8) was performed once again under the same conditions, and the generated gas was passed through a 1 mol/L NaOH aqueous solution to remove carbon dioxide. Then, only the remaining hydrogen was collected in a measuring cylinder over water, and the amount of generated hydrogen was measured. Furthermore, when the generation of hydrogen was completed, another 25-fold molar amount of formic acid with respect to the aqua complex (8) was added, and the amount of newly generated hydrogen was measured in the same manner as described above. The graph in FIG. 1 shows the results of the measurements. In FIG. 1, the horizontal axis represents the time elapsed from the initial addition of formic acid, and the vertical axis represents the amount-of-substance ratio (molar ratio) of generated hydrogen ($H_2$) to the catalyst (aqua complex (8)). As shown in FIG. 1, after the initial addition of formic acid, the amount of generated hydrogen increased with the elapsed time (reaction time), and a 25-fold molar amount (5.3 mL) of hydrogen with respect to the aqua complex (8) was generated in about 2400 seconds (40 minutes). That is to say, it was confirmed that by using the aqua complex (8) as the catalyst, 25 equivalents of formic acid could be converted completely to hydrogen under reaction conditions at normal temperature and pressure. Furthermore, when another 25-fold molar amount (25 equivalents) of formic acid with respect to the aqua complex (8) was added afterward, the catalytic reactivity remained almost the same as that at the time of the initial addition of formic acid and so hydrogen was generated efficiently, as shown in FIG. 1. As described above, the aqua complex (8) can be utilized repeatedly at a very low concentration (about 2 wt %) as a catalyst for the decomposition of formic acid.

Examples 2 to 4

Decomposition of Formic Acid and Production of Hydrogen Under Heating

Figure 2:
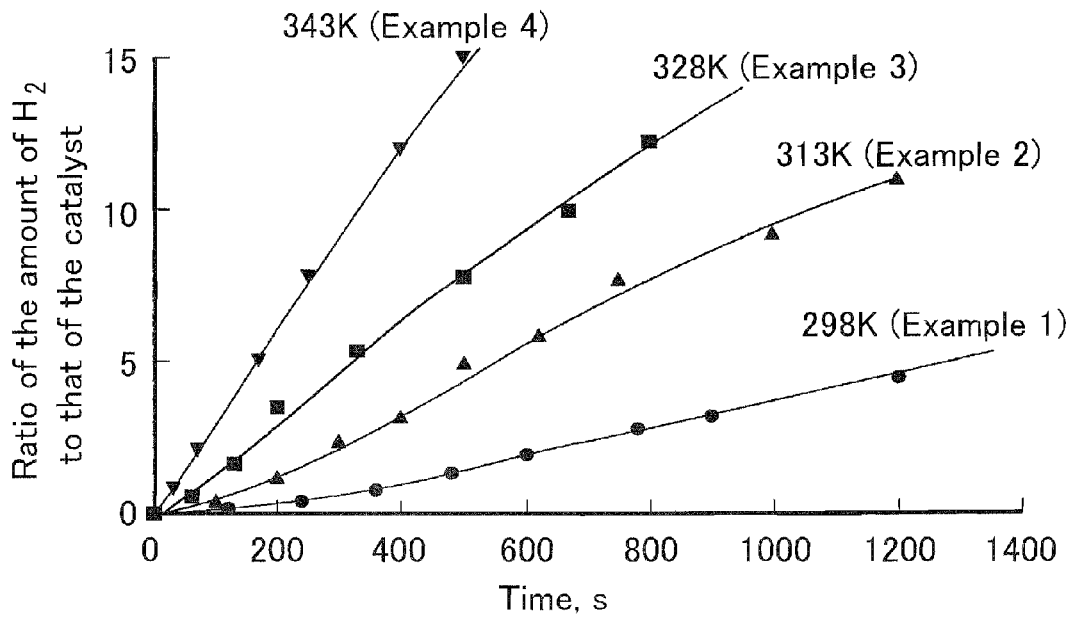
FIG. 2 is a graph in which the amounts of hydrogen generated by carrying out formic acid decomposition reactions using the catalyst of the example at different reaction temperatures are compared with one another.

The iridium-ruthenium dinuclear aqua complex (8) produced in Complex Production Example 1 was dissolved in 400 µL of water to form a $2.2 \times 10^{-2}$ mol/L aqueous solution. After deoxygenation of this aqueous solution, 8.3 µL ($5.5 \times 10^{-1}$ mol/L) of formic acid was added to the aqueous solution and reacted at different temperatures, i.e., 313 K (40° C.), 328 K (55° C.), or 343 K (70° C.), and the amounts of generated hydrogen were compared with one another. The graph in FIG. 2 shows the results. In FIG. 2, the horizontal axis represents the time elapsed from the addition of formic acid up to 1400 seconds. The vertical axis represents the amount-of-substance ratio (molar ratio) of the generated hydrogen ($H_2$) to the catalyst (aqua complex (8)) up to a maximum of 15. The curve with solid circles shows the results of the measurement at 298 K, the curve with solid triangles shows the results at 313 K (Example 2), the curve with solid squares shows the results at 328 K (Example 3), and the curve with inverted solid triangles shows the results at 343 K (Example 4). As described above, with the aqua complex (8), hydrogen could be generated by decomposing formic acid efficiently enough even at room temperature. However, as shown in FIG. 2, the rate of hydrogen generation could be increased more than tenfold by increasing the reaction temperature.

Example 5

Decomposition of Formic Acid and Production of Hydrogen Under Varying pHs

Figure 3:
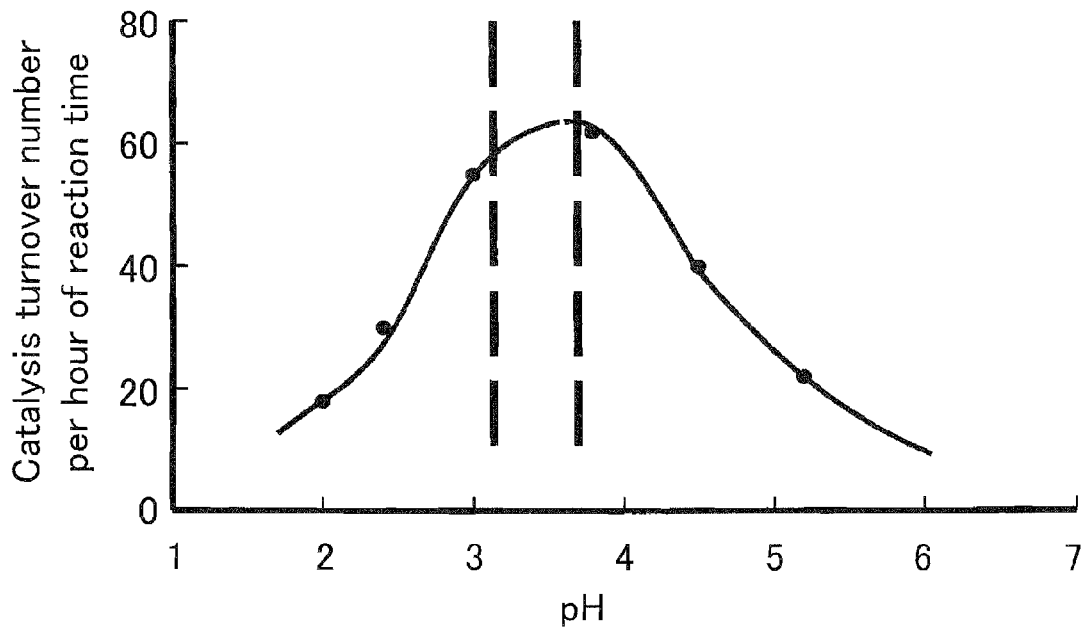
FIG. 3 is a graph in which the amounts of hydrogen generated by carrying out formic acid decomposition reactions using the catalyst of the example in solutions at different pHs are compared with one another.

Furthermore, formic acid decomposition was performed under the same conditions as in Example 1 except that a 0.1 mol/L dilute sulfuric acid was added to an aqueous solution of the aqua complex (8) to adjust the pH, and catalysis turnover numbers at different pHs were compared with one another. The graph in FIG. 3 shows the results. In FIG. 3, the horizontal axis represents the pH, and the vertical axis represents the catalysis turnover number per hour of reaction time. The curve in FIG. 3 shows the changes in catalysis turnover number in response to the changes in pH. Moreover, out of the two dotted lines, the dotted line on the left side indicates a pH of 3.2 (corresponding to the $pK_a$ of the iridium hydride complex (9)) and the dotted line on the right side indicates a pH of 3.8 (corresponding to the $pK_a$ of formic acid). As shown in FIG. 3, the catalysis turnover number reached its peak around pH 3.2 to 3.8 and showed a very high value as high as 60 or higher.

Note that it can be considered that in the formic acid decomposition using the aqua complex (8), the iridium hydride complex (9) or the iridium monovalent complex (10) formed by the reaction of the aqua complex (8) with formic acid serves as a catalyst, and the rate of hydrogen generation increases as the concentration of the iridium hydride complex (9) or the iridium monovalent complex (10) increases. However, this is merely an example of an inferable mechanism and is not to be construed as limiting the present invention.

As shown in Examples 1 to 5, if the decomposition of formic acid is performed using the catalyst for the decomposition of formic acid according to the present invention, it is also possible to release hydrogen sustainably and safely at room temperature (under normal temperature and pressure). Thus, it is also possible to store hydrogen in the form of formic acid, which is a safe compound, or an aqueous solution of formic acid. Moreover, not only can the reaction be carried out at room temperature, but also hydrogen can be generated even more efficiently by carrying out the reaction by applying heat.

INDUSTRIAL APPLICABILITY

As described above, according to the present invention, a catalyst for the decomposition of formic acid that is capable of providing hydrogen ($H_2$) safely, efficiently, and at low cost can be provided. That is to say, it is possible to store hydrogen in the form of formic acid, which is a safe compound, and obtain hydrogen by efficiently decomposing formic acid using the catalyst for the decomposition of formic acid according to the present invention. Moreover, the catalyst for the decomposition of formic acid according to the present invention has high formic acid decomposition reactivity and, therefore, can provide hydrogen efficiently. Furthermore, for example, it is also possible to obtain hydrogen by carrying out the formic acid decomposition reaction at room temperature (at normal temperature and pressure) without applying any external energy such as heat. For this reason, it is possible to prevent the release of $CO_2$ from an external heat source or the like into the atmosphere, and so the catalyst of the present invention even can contribute to, for example, the global issue of the reduction of $CO_2$. Moreover, not only can the reaction be carried out at room temperature, but also the formic acid decomposition reaction can be carried out even more efficiently by heating. Furthermore, hydrogen can be obtained without the formation of a toxic by-product.

The catalyst for the decomposition of formic acid according to the present invention may be used dissolved in, for example, an organic solvent, but when water alone is used as the solvent, undesirable effects on the environment can be reduced even more, so it is expected that the catalyst of the present invention will be increasingly used as a novel ecological technology in various industrial applications. Moreover, the catalyst of the present invention can also contribute to resource savings because of its good turnover efficiency. The catalyst of the present invention can be used in, for example, formic acid fuel cells and the like as a catalyst for the decomposition of formic acid. Furthermore, the applications of the catalyst for the decomposition of formic acid according to the present invention are not limited to the aforementioned applications, and, for example, the catalyst of the present invention can be used in every technical field in which a supply of hydrogen ($H_2$) is needed.

The invention claimed is:

1. A catalyst for decomposition of formic acid comprising a dinuclear metal complex represented by a formula (1) below, a tautomer or stereoisomer thereof, or any of their salts,

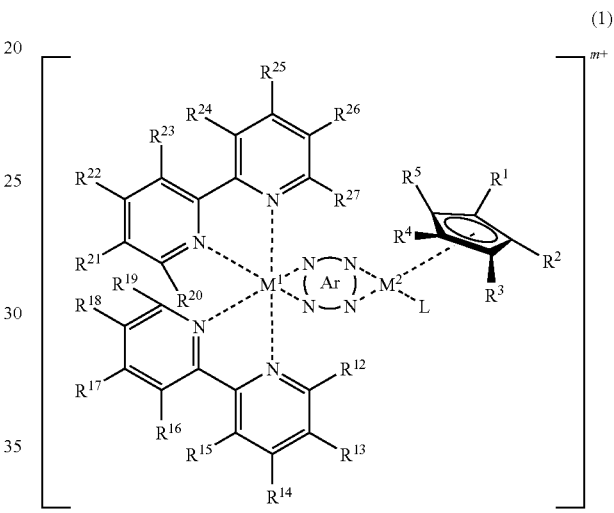

(1)

where $M^1$ and $M^2$ are transition metals and may be the same or different;
Ar is a ligand having aromaticity and may be unsubstituted or substituted by one or more substituents;
$R^1$ to $R^5$ are each independently a hydrogen atom, an alkyl group, a phenyl group, or a cyclopentadienyl group;
$R^{12}$ to $R^{27}$ are each independently a hydrogen atom, an alkyl group, a phenyl group, a nitro group, a halogen group, a sulfonic acid group (sulfo group), an amino group, a carboxylic acid group (carboxy group), a hydroxy group, or an alkoxy group, or
$R^{15}$ and $R^{16}$ may together form a —CH=CH—, that is, $R^{15}$ and $R^{16}$ may, together with a bipyridine ring to which $R^{15}$ and $R^{16}$ are bonded, form a phenanthroline ring, where Hs in the —CH=CH— may be each independently replaced by an alkyl group, a phenyl group, a nitro group, a halogen group, a sulfonic acid group (sulfo group), an amino group, a carboxylic acid group (carboxy group), a hydroxy group, or an alkoxy group, and
$R^{23}$ and $R^{24}$ may together form a —CH=CH—, that is, $R^{23}$ and $R^{24}$ may, together with a bipyridine ring to which $R^{23}$ and $R^{24}$ are bonded, form a phenanthroline ring, where Hs in the —CH=CH— may be each independently replaced by an alkyl group, a phenyl group, a nitro group, a halogen group, a sulfonic acid group (sulfo group), an amino group, a carboxylic acid group (carboxy group), a hydroxy group, or an alkoxy group;
L is an arbitrary ligand or is absent; and
m is a positive integer, 0, or a negative integer.

2. The catalyst for the decomposition of formic acid according to claim 1, wherein in the formula (1), the one or more substituents on Ar are each independently an alkyl group, a phenyl group, or a cyclopentadienyl group.

3. The catalyst for the decomposition of formic acid according to claim 1, wherein in the formula (1), L is a water molecule, a hydrogen atom, an alkoxide ion, a hydroxide ion, a halide ion, a carbonate ion, a trifluoromethanesulfonate ion, a sulfate ion, a nitrate ion, a formate ion, or an acetate ion or is absent.

4. The catalyst for the decomposition of formic acid according to claim 1, wherein all of $R^1$ to $R^5$ are methyl groups.

5. The catalyst for the decomposition of formic acid according to claim 1, wherein all of $R^{12}$ to $R^{27}$ are hydrogen atoms.

6. The catalyst for the decomposition of formic acid according to claim 1, wherein $M^1$ is ruthenium, osmium, iron, manganese, chromium, cobalt, iridium, or rhodium.

7. The catalyst for the decomposition of formic acid according to claim 1, wherein $M^2$ is iridium, ruthenium, rhodium, cobalt, osmium, nickel, or platinum.

8. The catalyst for the decomposition of formic acid according to claim 1, wherein $M^1$ is ruthenium and $M^2$ is iridium.

9. The catalyst for the decomposition of formic acid according to claim 1, wherein m is 2, 3, or 4.

10. The catalyst for the decomposition of formic acid according to claim 1, wherein the dinuclear metal complex of the formula (1) is a dinuclear metal complex having a structure represented by a formula (6) below, (6)

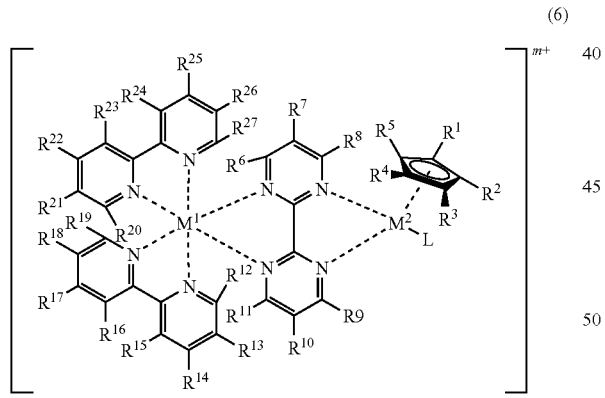

where $R^6$ to $R^{11}$ are each independently a hydrogen atom, an alkyl group, a phenyl group, a nitro group, a halogen group, a sulfonic acid group (sulfo group), an amino group, a carboxylic acid group (carboxy group), a hydroxy group, or an alkoxy group; and
$M^1$, $M^2$, $R^1$ to $R^5$, $R^{12}$ to $R^{27}$, L, and m are assigned the same definition as those in the formula (1).

11. The catalyst for the decomposition of formic acid according to claim 10, wherein all of $R^6$ to $R^{27}$ are hydrogen atoms.

12. The catalyst for the decomposition of formic acid according to claim 11, which is represented by a formula (7) below, (7)

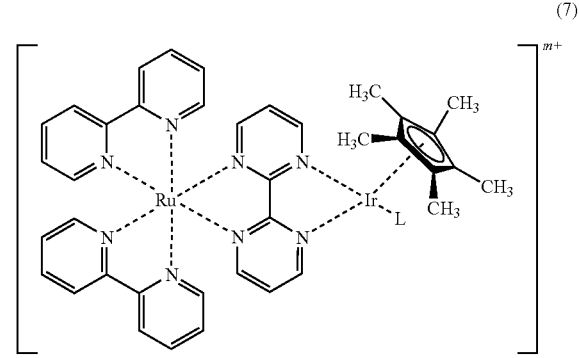

where L and m are assigned the same definition as those in the formula (6).

13. The catalyst for the decomposition of formic acid according to claim 12, which is represented by any one of formulae (8) to (11) below.

(8)

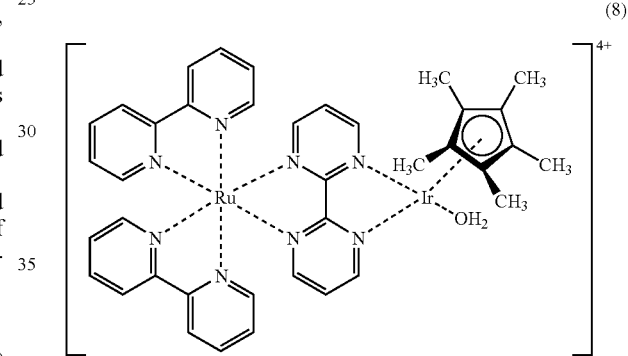

(9)

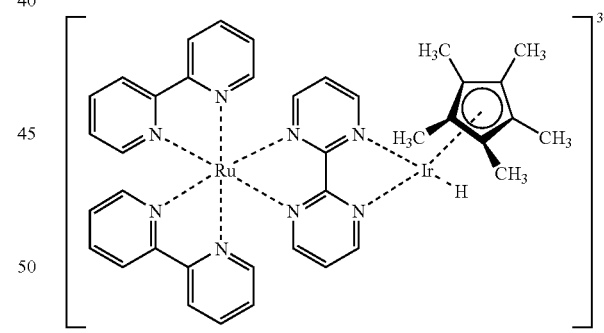

(10)

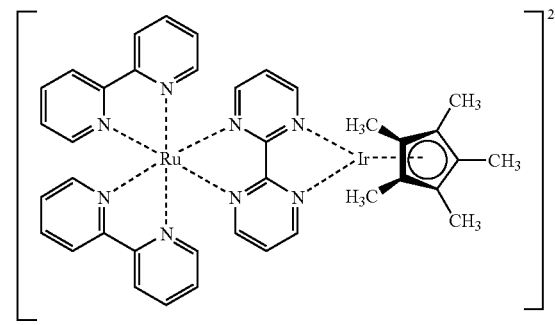

-continued

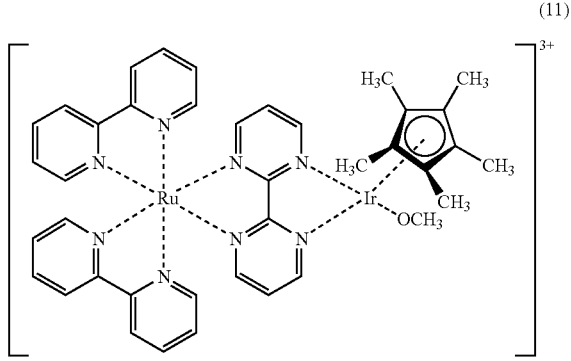

(11)

14. A method for decomposing formic acid comprising at least one step selected from the group consisting of the steps of: allowing a solution containing the catalyst for the decomposition of formic acid according to claim 1 and formic acid to stand as it is; heating the solution; and irradiating the solution with light.

15. The method according to claim 14, wherein the solution is an aqueous solution.

16. An apparatus for decomposing formic acid, comprising a formic acid decomposing portion for generating hydrogen ($H_2$) and carbon dioxide ($CO_2$) by decomposing formic acid and a formic acid producing portion for producing formic acid from hydrogen ($H_2$) and carbon dioxide ($CO_2$), wherein the formic acid decomposing portion contains the catalyst for the decomposition of formic acid according to claim 1; and the formic acid producing portion contains a catalyst for production of formic acid for producing formic acid by reacting hydrogen ($H_2$) with carbon Dioxide ($CO_2$).

* * * * *